(12) United States Patent
Park et al.

(10) Patent No.: US 7,280,174 B2
(45) Date of Patent: Oct. 9, 2007

(54) TRANSFLECTIVE LIQUID CRYSTAL DISPLAY AND METHOD OF FABRICATING THE SAME

(75) Inventors: Jae-Deok Park, Gyeongsangbuk-do (KR); Hun Jeoung, Gyeongsangbuk-do (KR); Soon-Kwang Hong, Dae-gu (KR)

(73) Assignee: LG Philips LCD Co., Ltd., Seoul (KR)

( * ) Notice: Subject to any disclaimer, the term of this patent is extended or adjusted under 35 U.S.C. 154(b) by 211 days.

(21) Appl. No.: 10/825,714

(22) Filed: Apr. 14, 2004

(65) Prior Publication Data
US 2005/0018114 A1 Jan. 27, 2005

(30) Foreign Application Priority Data
Jun. 11, 2003 (KR) ............... 10-2003-0037416

(51) Int. Cl.
*G02F 1/1368* (2006.01)
*G02F 1/1335* (2006.01)

(52) U.S. Cl. ............... 349/114; 349/39; 349/48; 349/187; 438/30

(58) Field of Classification Search ............... 349/38, 349/39, 43, 106, 110, 113, 114, 187, 42, 143, 349/144; 257/59, 72; 345/92; 438/30
See application file for complete search history.

(56) References Cited

U.S. PATENT DOCUMENTS 5,225,823 A * 7/1993 Kanaly ............... 345/89
5,760,858 A * 6/1998 Hodson et al. ............... 349/61
6,806,929 B2 * 10/2004 Chen et al. ............... 349/114
6,940,496 B1 * 9/2005 Kim ............... 345/204
2002/0109811 A1 * 8/2002 Park et al. ............... 349/113
2004/0239846 A1 * 12/2004 Wen et al. ............... 349/114

FOREIGN PATENT DOCUMENTS

| JP | 2000-305110 | 11/2000 |
| JP | 2002-258300 | 9/2002 |
| JP | 2003-156616 | 5/2003 |

\* cited by examiner

Primary Examiner—Toan Ton
Assistant Examiner—Tai Duong
(74) Attorney, Agent, or Firm—Brinks Hofer Gilson Lione

(57) ABSTRACT

A transflective liquid crystal display includes gate and data lines perpendicular to each other and defining a plurality of unit pixels. Each unit pixel includes a plurality of sub-pixel regions, which each have a transmissive portions and a reflective portion. The transmissive portions are gathered together within each unit pixel at corners of the sub-pixel regions opposing corners in which thin film transistors near the crossings of the gate and data lines are disposed. A passivation layer covering the thin film transistors and the gate and data lines has an opening that corresponds to the transmissive portions in the unit pixel. A reflector is formed over the passivation layer in each sub-pixel region and corresponds in position to the reflective portion. A pixel electrode in each sub-pixel region contacts the thin film transistor through a contact hole in the passivation layer.

86 Claims, 40 Drawing Sheets

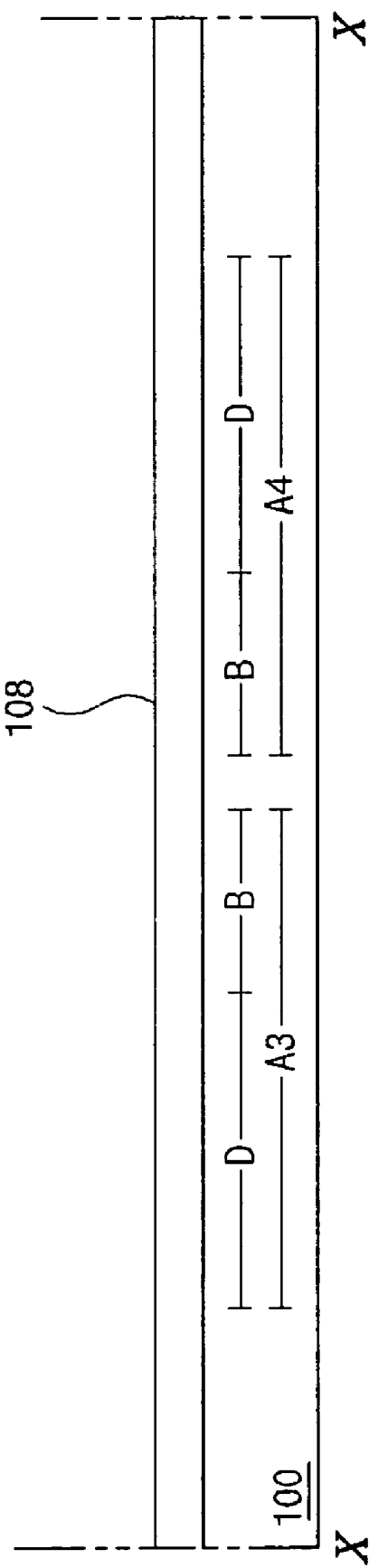

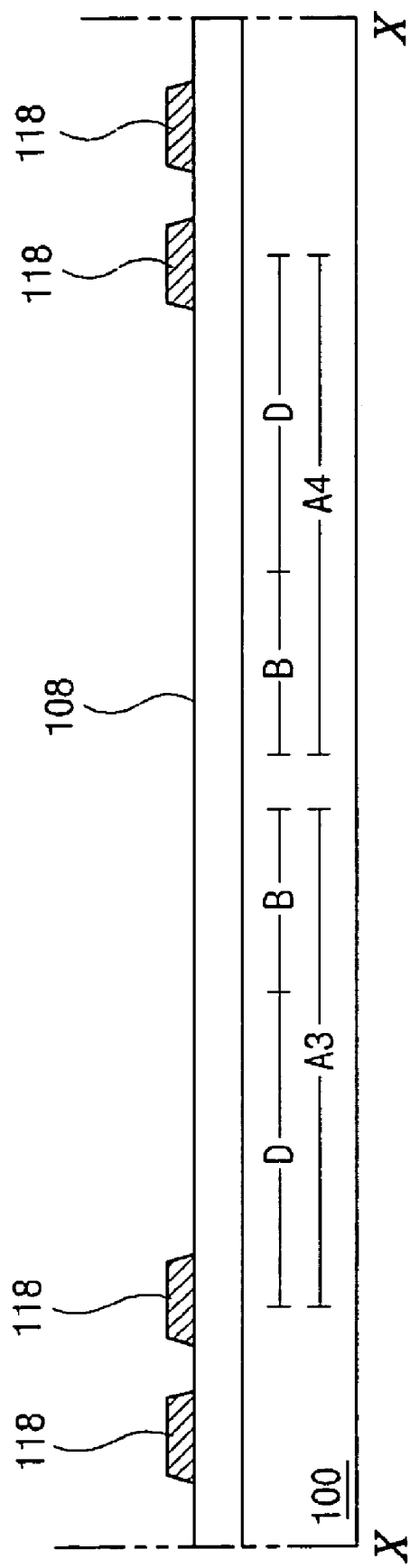

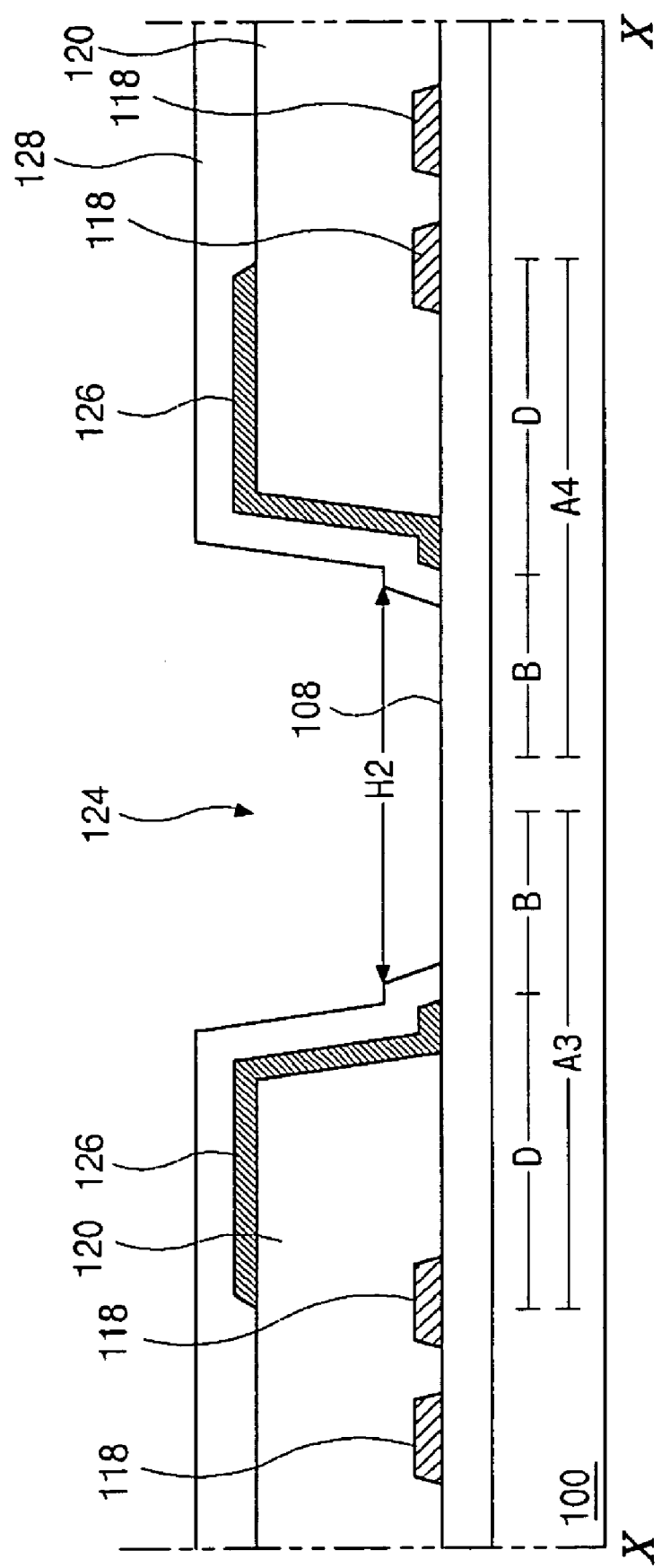

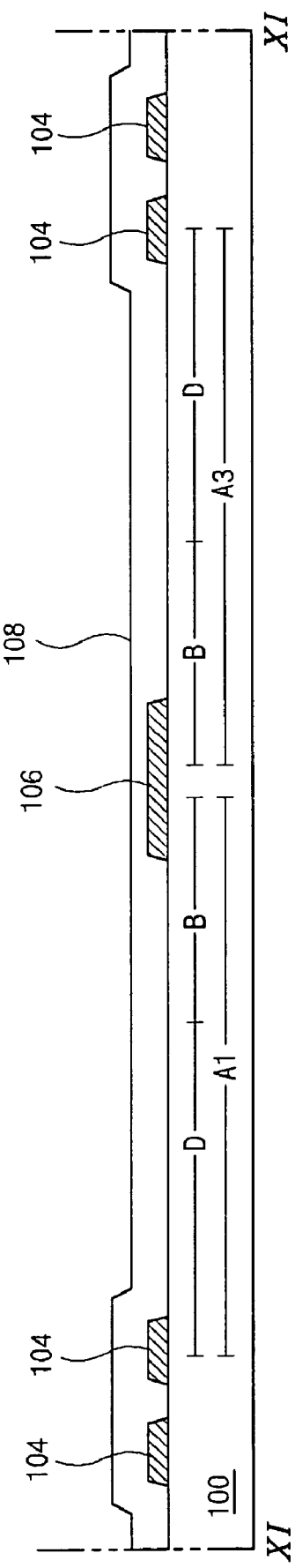

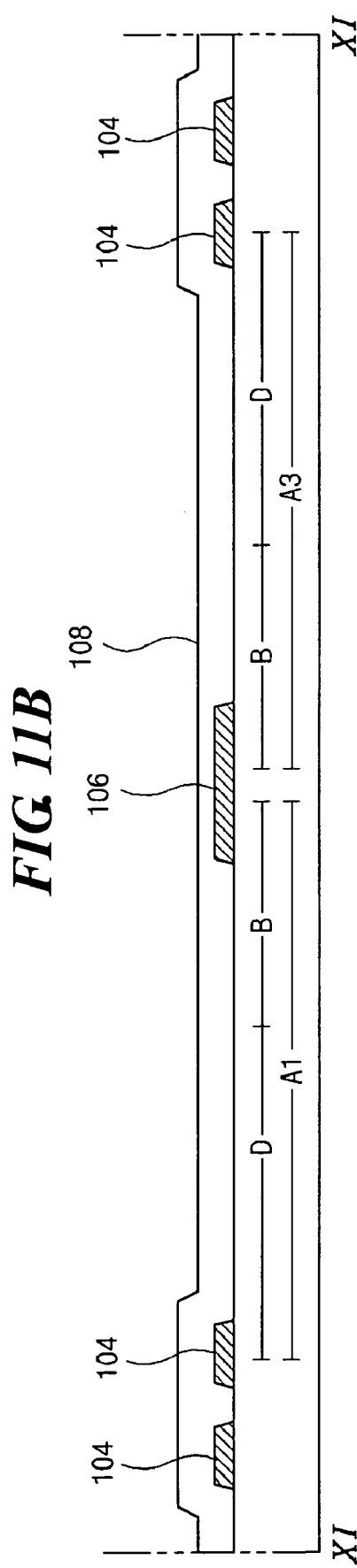

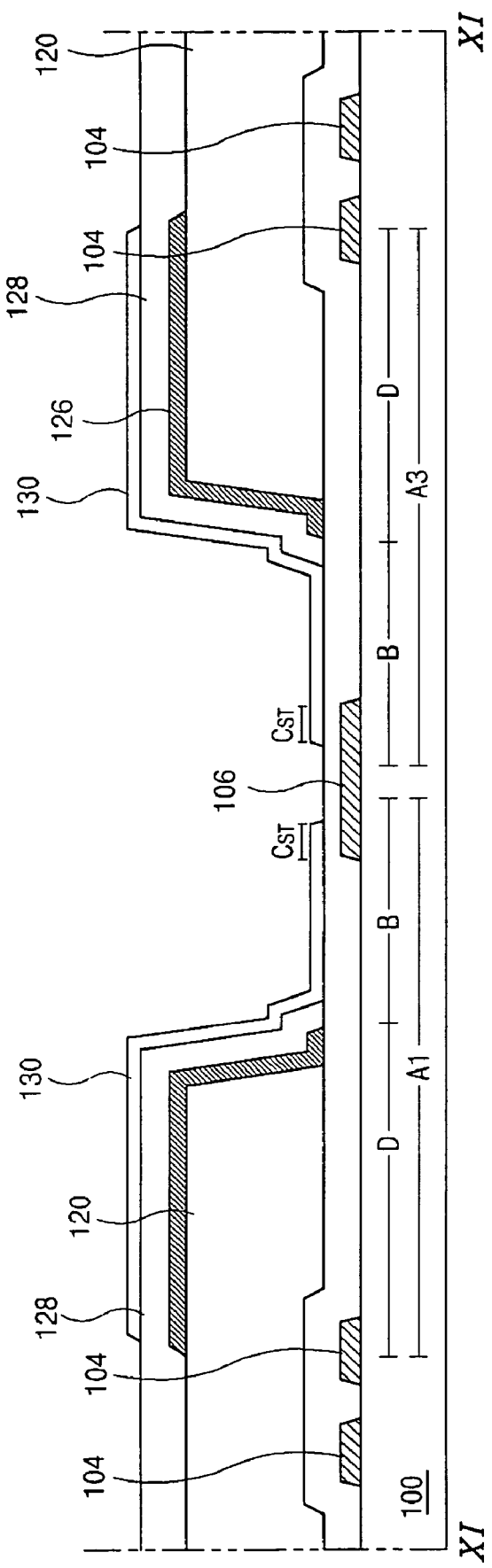

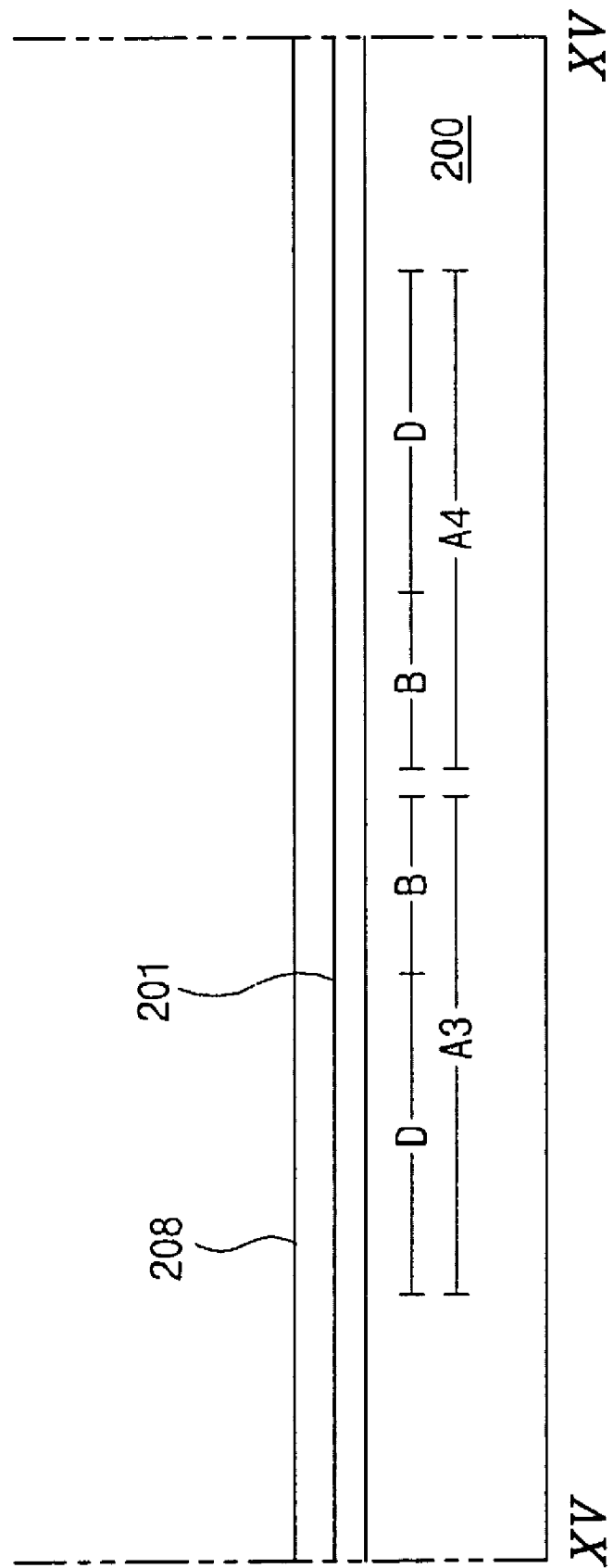

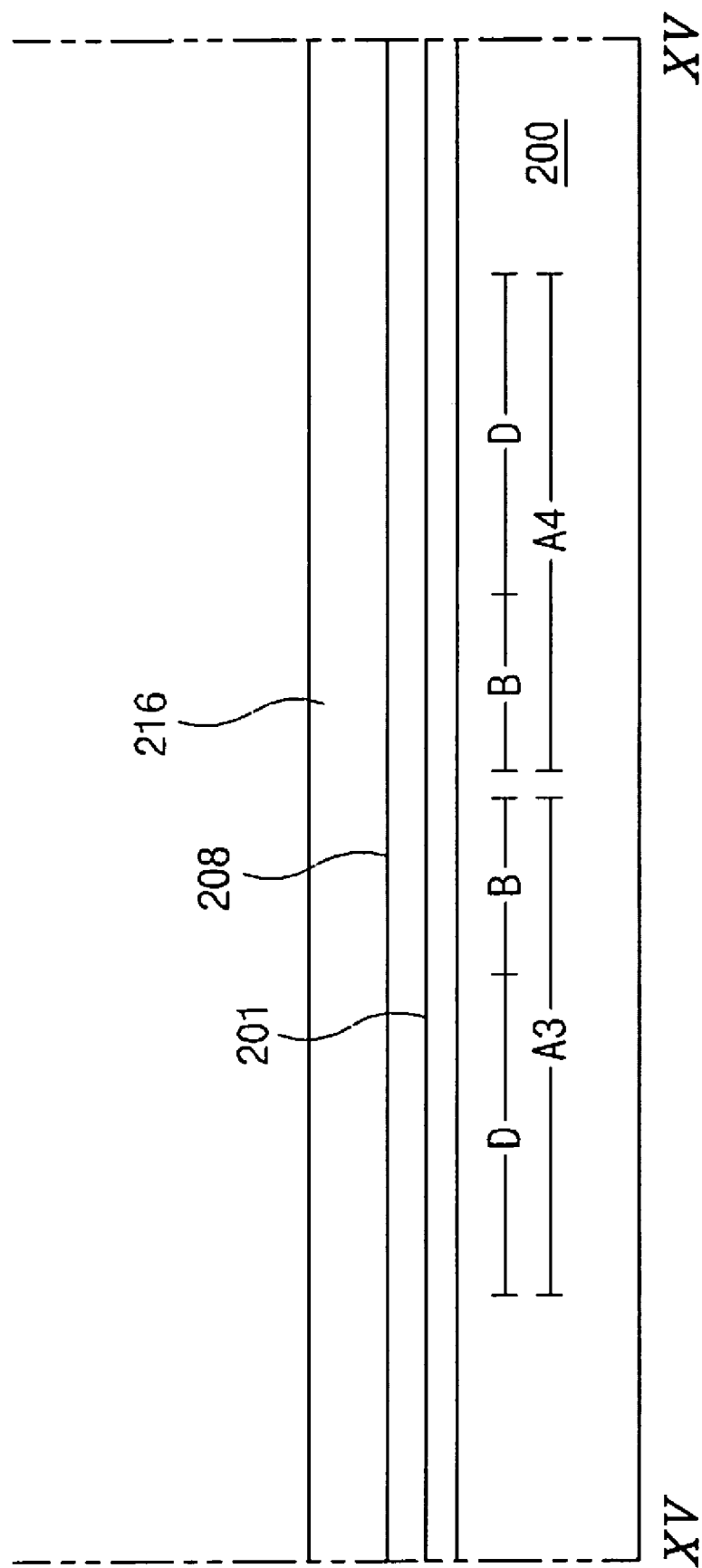

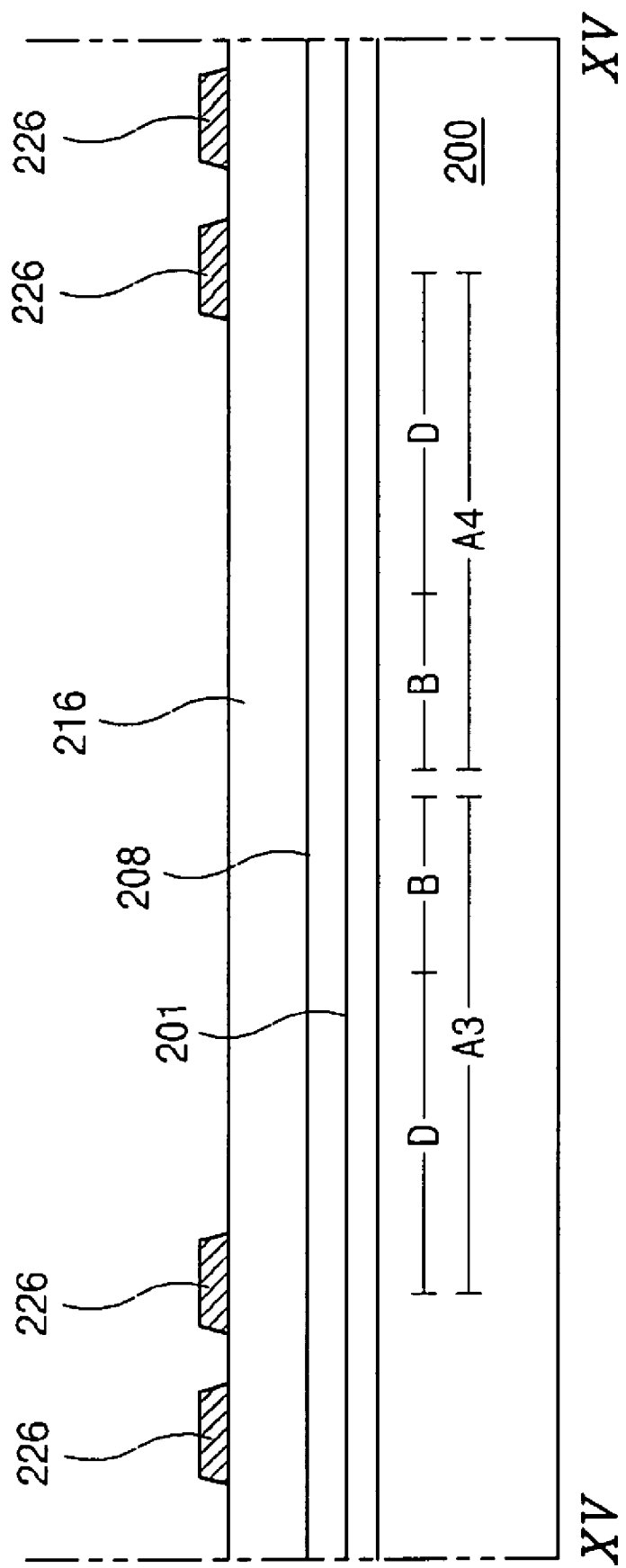

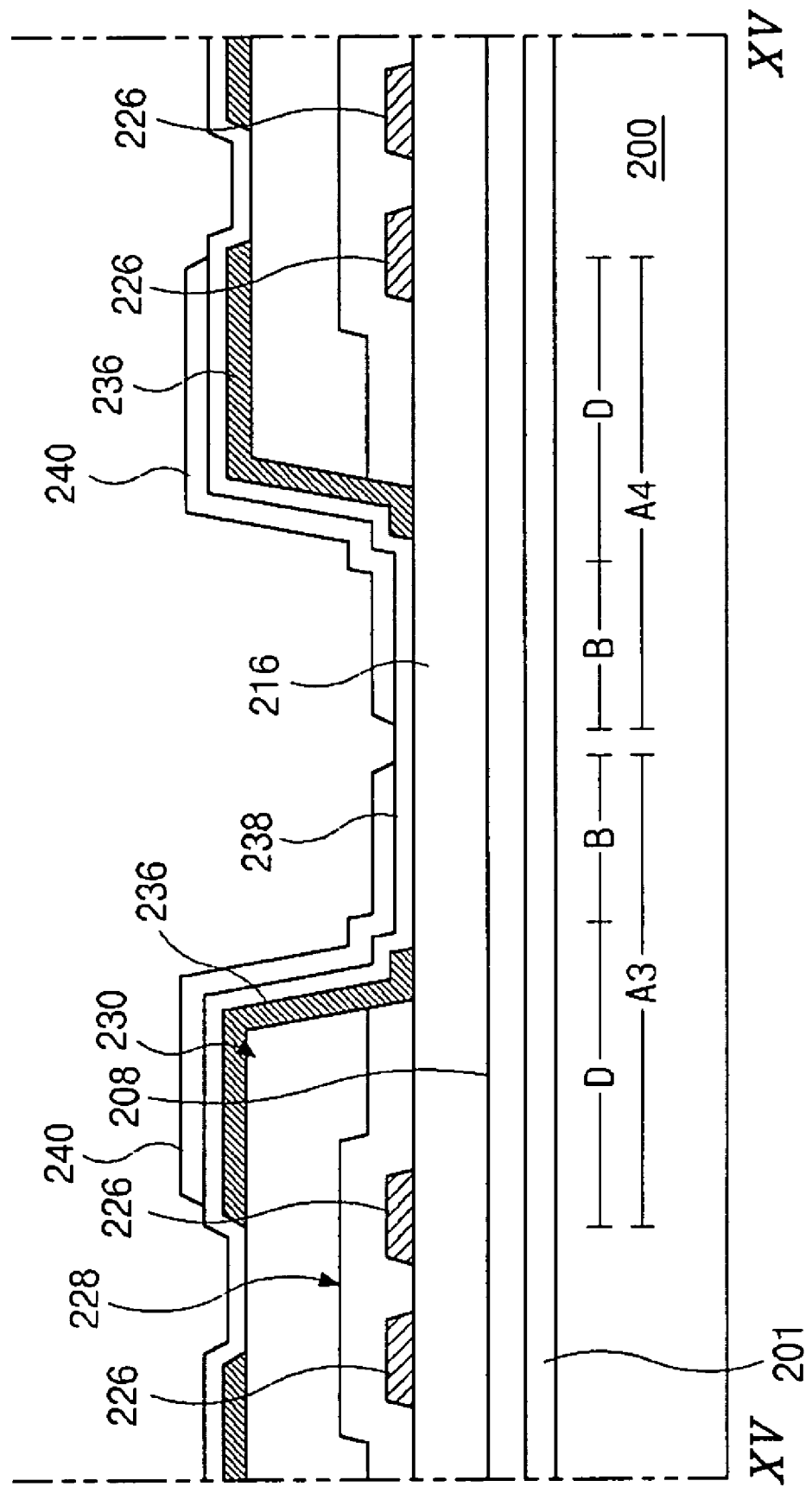

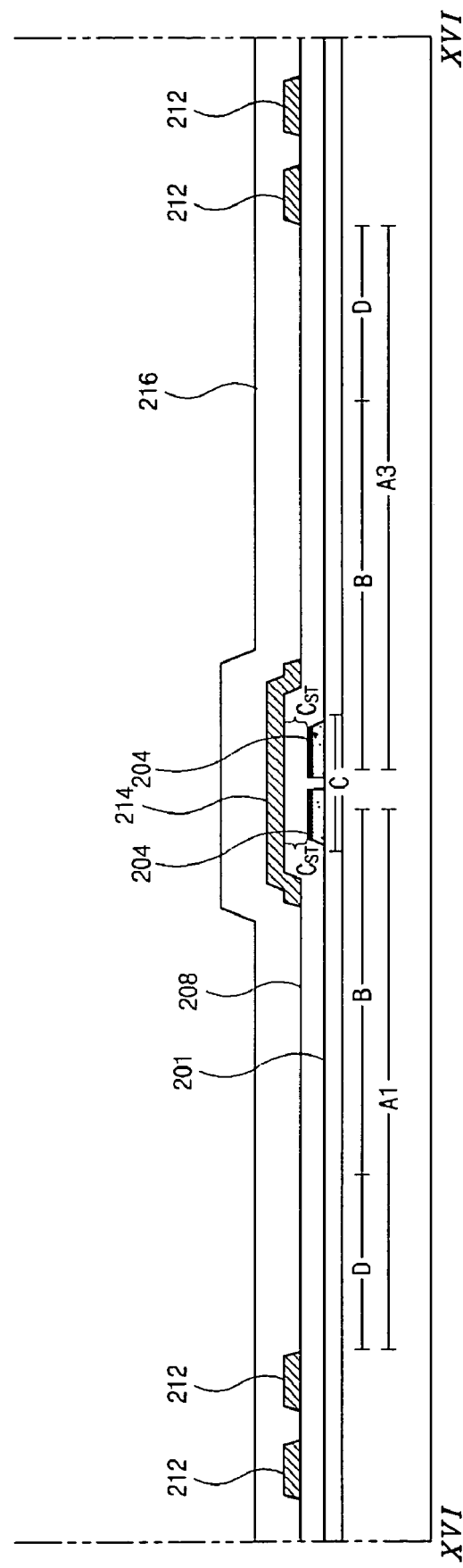

TRANSFLECTIVE LIQUID CRYSTAL DISPLAY AND METHOD OF FABRICATING THE SAME

This application claims the benefit of Korean Application No. 2003-0037416 filed on Jun. 11, 2003, which is hereby incorporated by reference.

BACKGROUND OF THE INVENTION

1. Field of the Invention

The present invention relates to a liquid crystal display, and more particularly, to a transflective liquid crystal display and method of fabricating the same.

2. Discussion of the Related Art

In general, both transmission and reflection type liquid crystal displays (LCD) are used. Transmission type LCDs use internal light sources while reflection type LCDs use external light sources. The transmission type LCD has a liquid crystal display panel, which does not emit light itself, and has a backlight as a light-illuminating section.

The backlight is disposed at the rear or one side of the panel. The amount of the light from the backlight that passes through the liquid crystal panel is controlled by the liquid crystal panel in order to implement an image display. In other words, the light from the backlight varies and displays images according to the arrangement of the liquid crystal molecules. However, the backlight of the transmission type LCD consumes 50% or more of the total power consumed by the LCD device. Providing a backlight therefore increases power consumption.

In order to overcome the above problem, a reflection type LCD has been selected for portable information apparatuses that are often used outdoors or carried with users. Such a reflection type LCD is provided with a reflector formed on one of a pair of substrates. Thus, ambient light is reflected from the surface of the reflector. The reflection type LCD using the reflection of ambient light is disadvantageous in that a visibility of the display is extremely poor when surrounding environment is dark.

In order to overcome the above problems, a construction which realizes both a transmissive mode display and a reflective mode display in one liquid crystal display device has been proposed. This is so called a transflective liquid crystal display device. The transflective liquid crystal display (LCD) device alternatively acts as a transmissive LCD device and a reflective LCD device. Due to the fact that a transflective LCD device can make use of both internal and external light sources, it can be operated in bright ambient light as well as has a low power consumption.

FIG. 1 shows a related art transflective liquid crystal display (LCD) device, and FIG. 2 is a plan view showing the related art transflective LCD device of FIG. 1. The transflective LCD device 10 includes upper and lower substrates 80 and 60 with an interposed liquid crystal layer 95. The upper and lower substrates 80 and 60 are sometimes respectively referred to as a color filter substrate and an array substrate.

On the surface facing into the lower substrate 60, the upper substrate 80 includes, in series, a color filter layer 90 and a common electrode 86. The color filter layer 90 includes a plurality of sub-color filters 82 and a black matrix 84. The sub-color filters 82 includes a matrix array of red, green, and blue color filters and the black matrix 84 is disposed among the sub-color filters 82, such that each sub-color filter 82 is divided by the black matrix 86. The common electrode 86 is over the sub-color filters 82 and the black matrix 84.

On the surface facing into the upper substrate 80, the lower substrate 60 includes an array of thin film transistors (designated as TFT "T" in FIG. 1) that act as switching devices. The array of thin film transistors is formed to correspond to the matrix of sub-color filters. A plurality of gate and data lines 61 and 62 are positioned and crossed over each other. A TFT is located near at each crossing portion of the gate and data lines 61 and 62. The lower substrate 60 also includes a plurality of pixel regions P that are defined by the crossing of the gate and data lines 61 and 62, as shown in FIG. 1. Transparent and reflective electrodes 64 and 66 are disposed in the pixel regions P. Each pixel region P is divided into a transmissive portion B and reflective portion D. The transmissive portion B is located in the middle of the reflective portion D. The reflective electrode 66 is disposed corresponding to the reflective potion D, and the transparent electrode 64 is disposed in the pixel region P with covering the transmissive portion B.

The transparent electrode 64 is usually formed of a transparent conductive material having good light transmissivity, such as indium tin oxide (ITO). The reflective electrode 66 is formed of a metallic material having a good reflectivity, such as aluminum (Al) or aluminum alloy.

FIG. 3 is a cross sectional view taken along a line III—III of FIG. 1 and illustrates a transflective LCD device according to a related art.

As shown, the first (lower) substrate 60 is spaced apart from and faces to the second (upper) substrate 80. The liquid crystal layer 95 is interposed between the first and second substrates 60 and 80. As described with reference to FIGS. 1 and 2, the plurality of pixels P, which are defined by the gate and data lines 61 and 62 both perpendicularly crossing to each other, are formed in the first and second substrates 60 and 80.

On a rear surface of the second substrate 80, formed are sub-color filters 82a and 82b each having one of the red, green and blue colors. The black matrix 84 is disposed between the sub-color filters 82a and 82b. The common electrode 86 is disposed on the rear surface of the sub-color filters 82a and 82b and the black matrix 84.

Each of the pixel regions P is divided into the reflective portion D and the transmissive portion B. In general, the reflective electrode 64 is formed within the reflective portion D, and the transparent electrode 66 is formed to correspond to the transmissive portion B. The reflective electrode 64 is usually formed over or under the transparent electrode 66. In FIG. 3, the reflective electrode 64 has a light-transmitting hole H that corresponds to the transmissive portion B, and the reflective electrode 64 is disposed under the transparent electrode 66.

In the transflective LCD device of FIG. 3, it is important that a color difference should not appear in between the transmissive portion B and the reflective portion D. Further, the transmissive and reflective portions B and D should have the same optical efficiency. However, an incident light traveling the reflective potion D passes the color filter twice because the incident light passing through the color filter reflects on the reflective electrode 64 and then proceeds towards the color filter again. Therefore, if the liquid crystal layer 95 has a cell gap "d" between the two substrates, the incident light makes a trip along a distance "2d" while a light passing through the transmissive portion B only has a "d"-distance journey. The phase retardation of the light can be represented by $2d\Delta n$ (2d.delta.n) when the light passes the liquid crystal layer 95 in the reflective potion D. On the contrary, the phase retardation of the light can be represented by dΔn (d.delta.n) when the light passes the liquid crystal layer 95 in the transmissive potion B. As a result, the reflective and transmissive portions D and B have difference phase retardation values such that it is impossible that the same color purity appears in both the reflective and transmissive portions D and B.

To solve the above problems, it is suggested that the transmissive portion B has a different cell gap substantially twice as much as the distance "d". Namely, the transflective LCD device is designed to have a first cell gap "d" in the reflective portion D and a second cell gape "2d" in the transmissive portion B. These difference cell gaps will now be explained with reference to FIG. 4.

FIG. 4 is a cross sectional view taken along a line III—III of FIG. 1 and illustrates the transflective LCD device according to another related art.

As shown, the first (lower) substrate 60 is spaced apart from and faces to the second (upper) substrate 80. The liquid crystal layer 95 is interposed between the first and second substrates 60 and 80. As described with reference to FIGS. 1 and 2, the plurality of pixels P, which are defined by the gate and data lines 61 and 62 both perpendicularly crossing to each other, are formed in the first and second substrates 60 and 80.

On a rear surface of the second substrate 80, formed are sub-color filters 82a and 82b each having one of the red, green and blue colors. Additionally, the black matrix 84 is disposed on the second substrate 80 between the sub-color filters 82a and 82b. The common electrode 86, which is transparent, is disposed on the rear surface of the sub-color filters 82a and 82b and the black matrix 84.

Like the transflective LCD device shown in FIG. 3, each of the pixel regions P is divided into the reflective portion D and the transmissive portion B. The reflective electrode 64 is formed within the reflective portion D, and the transparent electrode 66 is formed in the pixel region P with corresponding to both the transmissive portion B and the reflective potion D. The reflective electrode 64 is usually formed over or under the transparent electrode 66. In FIG. 4, the reflective electrode 64 has a light-transmitting hole H that corresponds to the transmissive portion B, and the reflective electrode 64 is disposed under the transparent electrode 66. Therefore, an area where the reflective electrode 64 is disposed is defined as a reflective portion D.

Unlike the transflective LCD device of FIG. 3, the transflective LCD device of FIG. 4 has a thick insulator 63 that has openings 61 in the transmissive portions B. Namely, each opening 61 is formed to correspond to the transmissive potion B in the insulator 63 such that the reflective and transmissive portions D and B have different cell gaps "d" and "2d". The liquid crystal layer 95 has a first cell gap "d" in the reflective potion D and a second cell gap "2d" in the transmissive portion B. If the insulator 63 is as thick as the first cell gap "d", the second cell gap "2d" will be a double than the first cell gap "d". Namely, since the thickness ratio of the transmissive portion B to the reflective portion D is 2d to d, the phase retardation becomes the same of 2dΔn (2d.delta.n). Furthermore, although not shown in FIG. 4, the reflective electrode 64 can have an uneven surface (with prominences and depressions) to increase the reflectivity thereof.

However, the transflective LCD device illustrated with reference to FIG. 4 may have some light leakage around an interface between the transmissive potion B and the reflective portion D. Such light leakage will be explained with reference to FIGS. 5 and 6.

FIG. 5 is a plan view illustrating one sub-pixel of an array substrate for use in a transflective LCD device according to a related art, and FIG. 6 is an enlarged cross section view illustrating a portion K of FIG. 5.

As shown, a gate line 61 is disposed in a horizontal direction over a substrate 60, and a data line 62 is disposed in a longitudinal direction perpendicularly crossing the gate line 61. The gate and data lines 61 and 62 cross each other to define a pixel region P. A thin film transistor T, which includes a gate electrode 70, an active layer 72 and source and drain electrodes 74 and 76, is disposed near a crossing of the gate and data lines 61 and 62. Like the previous description, the pixel region P is divided into a reflective portion D and a transmissive portion B. A reflective electrode 66 is formed in the reflective portion D and has an opening H in the middle thereof. A transparent electrode 64 is formed to correspond to the pixel region P, especially to cover the opening H that corresponds in size to the transmissive portion B. The opening has a width W and a length L.

Still referring to FIGS. 5 and 6, an insulator 63 has an opening that corresponds to the opening of the reflective electrode 66 and forms a step "d" to make different cell gaps, as illustrated with reference to FIG. 4. At this point, the insulator 63, however, has a slope 63a. Due to the step "d" and the slope 63a, a disclination may occur in an area F that is between the reflective portion D and the transmissive portion B. As shown in FIG. 6, the disclination occurs both in a first disclination area FI corresponding to the slope 63a and in a second disclination area F2 next to the slope 63a. The disclination area extends from the slope area F1 to the neighboring area F2.

In FIG. 6, if the slope 63a has a height d of about 2 micrometers and forms an angle θ of 50 degrees with the base, the bottom side of the triangular cross section will have a distance of about 1.7 micrometers (calculated by d/tan θ). Furthermore, the second disclination area usually has a distance of about 1.5 micrometers.

Accordingly, the disclination area F has a distance of about 3.5 micrometers (1.7+1.5). And thus, the dimensions (A) of the disclination area F will be represented by the following equation: A=2(L+W)×3.2 μm² (where L is the length of the opening and W is the width of the opening, as shown in FIG. 5).

Thus, the larger the opening, the bigger the disclination. Usually, the disclination area caused by the step and slope reduces the aperture ratio by about 10% in the transflective LCD device shown in FIGS. 4–6. This means that the brightness and the contrast ratio of the transflective LCD device are lowered correspondingly.

Moreover in the related art transflective LCD device, since the opening and the transmissive portion are relatively small and are located in the middle of the pixel region P, it is difficult to uniformly perform the rubbing process when inducing the initial alignment direction of the liquid crystals. This prevents uniform and stable transmittance from being attained in the transmissive portion.

SUMMARY OF THE INVENTION

Accordingly, the present invention is directed to a transflective liquid crystal display and a method of fabricating the same that substantially obviate one or more of the problems due to limitations and disadvantages of the related art.

Embodiments of the present invention provide a transflective LCD display and a method of fabricating the same achieving a high contrast ratio and brightness. The embodiments provide a transflective LCD display and a method of fabricating the same improving an aperture ratio and simplifying a rubbing process.

Additional features and advantages of the invention will be set forth in the description that follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a transflective liquid crystal display includes gate and data lines perpendicular to each other and defining a plurality of unit pixels. Each unit pixel includes a plurality of sub-pixel regions. Each of the sub-pixel regions includes a transmissive portions and a reflective portion, of which the transmissive portions are gathered together within each unit pixel. A thin film transistor is disposed in each sub-pixel region near a crossing of the gate and data lines. A passivation layer covers the thin film transistors and the gate and data lines. The passivation layer has an opening that corresponds to the transmissive portions in the unit pixel. A reflector formed over the passivation layer in each sub-pixel region corresponds in position to the reflective portion. A pixel electrode in each sub-pixel region contacts the thin film transistor through a contact hole in the passivation layer.

In another aspect of the present invention, a method of forming an array substrate in a transflective liquid crystal display includes forming a plurality of gate lines, a plurality of storage lines, and a plurality of gate electrodes on a substrate. A gate insulating layer on the substrate is formed to cover the gate lines, the storage lines and the gate electrodes. An active layer and an ohmic contact layer are formed in series over each of the gate electrodes on the gate insulating layer. A plurality of data lines, a plurality of source electrodes, and a plurality of drain electrode are formed over the gate insulating layer. Each of the source and drain electrodes contacts the ohmic contact layer. The data lines perpendicularly cross the gate lines and define unit pixels. Each of the unit pixels includes a plurality of sub-pixel regions. Each sub-pixel region includes a transmissive portion and a reflective portion. The reflective portions of the sub-pixel regions are gathered together in the center of the unit pixel. A first passivation layer is formed on the gate insulating layer to cover the data lines, the source electrodes and the drain electrodes. The first passivation layer includes a contact hole exposing a portion of the drain electrode and a first opening exposing the gate insulating layer in the transmissive portions. Reflectors are formed within the reflective portions and correspond to each sub-pixel region. A second passivation layer is formed on the first passivation layer to cover the reflectors and has a second opening exposing the gate insulating layer in the transmissive portions. Pixel electrodes are formed on the second passivation layer in the sub-pixel regions.

In another aspect of the present invention, a method of forming an array substrate in a transflective liquid crystal display includes defining a plurality of unit pixels in a substrate such that each of the unit pixels includes a plurality of sub-pixel regions, each sub-pixel region includes a transmissive portion and a reflective portion, and the reflective portions of the sub-pixel regions are gathered together in the center of the unit pixel. A buffer layer is formed on an entire of the substrate. A plurality of polycrystalline silicon layers and a plurality of polysilicon patterns are formed such that the polycrystalline silicon layers are disposed near corners of the unit pixels and the polysilicon patterns are disposed between the sub-pixel regions. A gate insulating layer is formed on the buffer layer to cover the polycrystalline silicon layers and the polysilicon patterns while a plurality of gate lines, a plurality of storage lines, and a plurality of gate electrodes are formed on the gate insulating layer. A first passivation layer is formed on the gate insulation layer to cover the gate lines, the storage lines and the gate electrodes. The first passivation layer and the gate insulating layers have contacts holes exposing portions of the polycrystalline silicon layers. A plurality of data lines, a plurality of source electrodes, and a plurality of drain electrode are formed on the first passivation layer. Each of the source and drain electrodes contacts the polycrystalline silicon layer through the contact holes and the data lines perpendicularly cross the gate lines and define the unit pixels. Second and third passivation layers are formed in series on the first passivation layer to cover the data lines, the source electrodes and the drain electrodes, and include a first contact hole exposing a portion of the drain electrode and a first opening exposing the first passivation layer in the transmissive portions. Reflectors are formed within the reflective portions, each reflector corresponding to each sub-pixel region. A fourth passivation layer is formed on the third passivation layer to cover the reflectors. The second passivation layer has a second contact hole exposing the portion of the drain electrode. A pixel electrodes is formed on the fourth passivation layer in the sub-pixel regions and contacts the drain electrode through the second contact hole.

In another aspect of the present invention, a method of forming a transflective liquid crystal display includes forming gate and data lines that perpendicularly cross each other and define a plurality of unit pixels. Each unit pixel includes a plurality of sub-pixel regions, each of the sub-pixel regions includes a transmissive portions and a reflective portion, and the transmissive portions are gathered together within each unit pixel. Thin film transistors are formed in each sub-pixel region near a crossing of the gate and data lines while a passivation layer covers the thin film transistors and the gate and data lines. The passivation layer has an opening that corresponds to the transmissive portions in the unit pixel. A reflector formed over the passivation layer in each sub-pixel region corresponds in position to the reflective portion. A pixel electrode formed in each sub-pixel region contacts the thin film transistor throughout a contact hole in the passivation layer.

In another embodiment, a transflective liquid crystal display includes first and second substrates having a liquid crystal layer disposed between the substrates. The first substrate has gate and data lines defining unit pixels. Each unit pixel includes a plurality of sub-pixel regions, which each include a transmissive portion and a reflective portion. Adjacent pairs of the transmissive portions in different sub-pixel regions within each unit pixel are arranged such that the reflective portion is not disposed between the pair of transmissive portions. A reflector is formed in the reflective portion of each sub-pixel region without being formed in the transmissive portion.

In another embodiment, a transflective liquid crystal display includes first and second substrates having a liquid crystal layer disposed between the substrates. The first substrate has gate and data lines defining unit pixels. Each unit pixel includes a plurality of sub-pixel regions, each of which include a transmissive portion and a reflective portion, a border area between the transmissive and reflective portions, a reflector and a passivation layer. The passivation layer and reflector are disposed in the reflective portion and terminate in the border area before reaching the transmissive portion. The border area contains a disclination of the passivation area and reflector that has a slope oblique to the first and second substrates. In addition, the border area and reflective portion of at least one sub-pixel region in each unit pixel does not completely encircle the transmissive portion of the at least one sub-pixel region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings:

FIGS. 10A–10E are cross sectional views taken along a line X—X of FIG. 7 and illustrate the fabrication process steps of sub-pixels;

FIGS. 11A–11E are cross sectional views respectively taken along a line XI—XI of FIG. 7 and illustrates the fabricating process steps of a unit pixel;

FIGS. 15A–15F are cross sectional views taken along a line XV—XV of FIG. 12 and illustrate the fabrication process steps of sub-pixels;

FIGS. 16A–16F are cross sectional views respectively taken along a line XVI—XVI of FIG. 12 and illustrates the fabricating process steps of a unit pixel;

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 7:
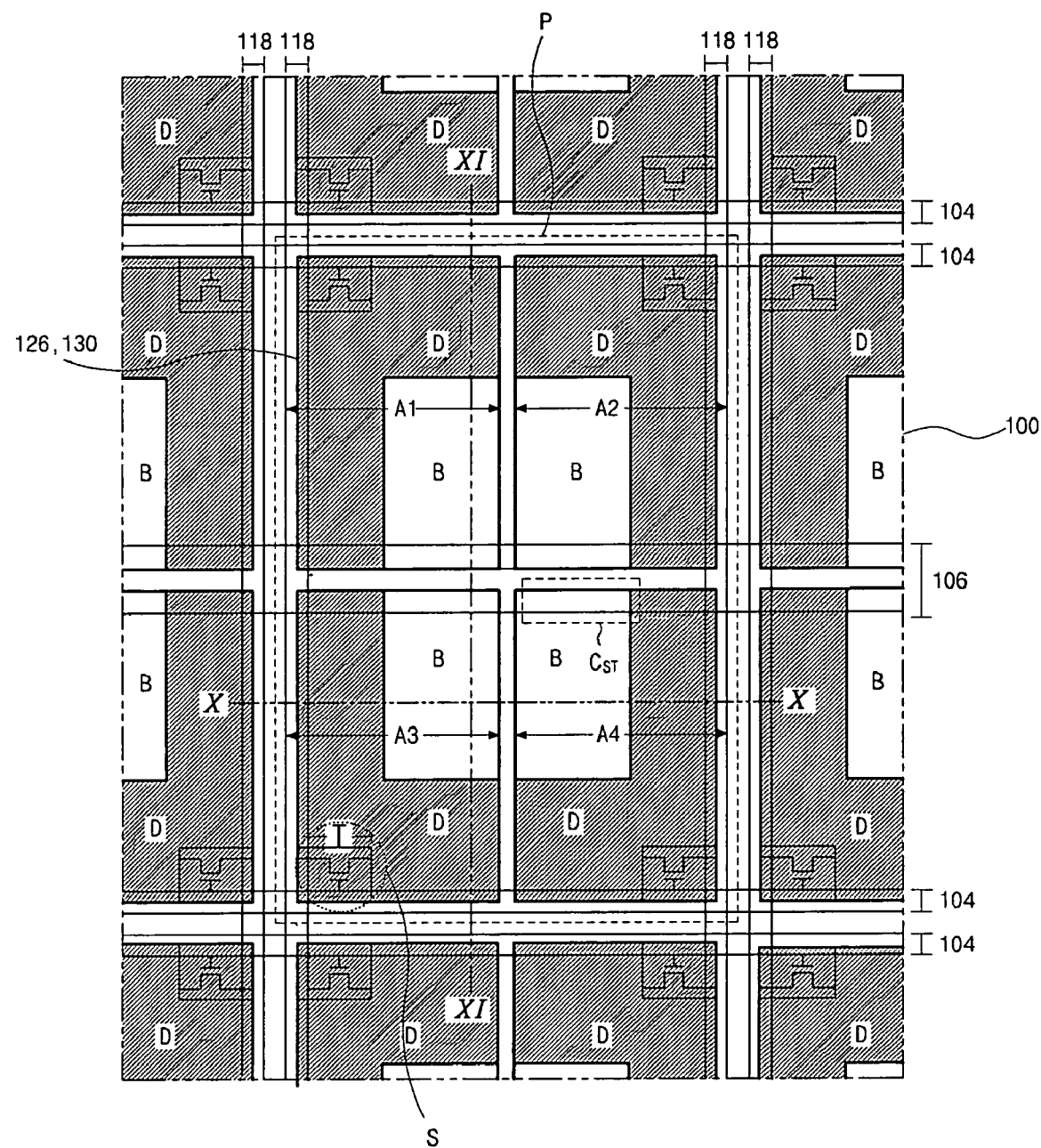
FIG. 7 is a plan view illustrating a transflective LCD device according to a first embodiment of the present invention.
Figure 8:
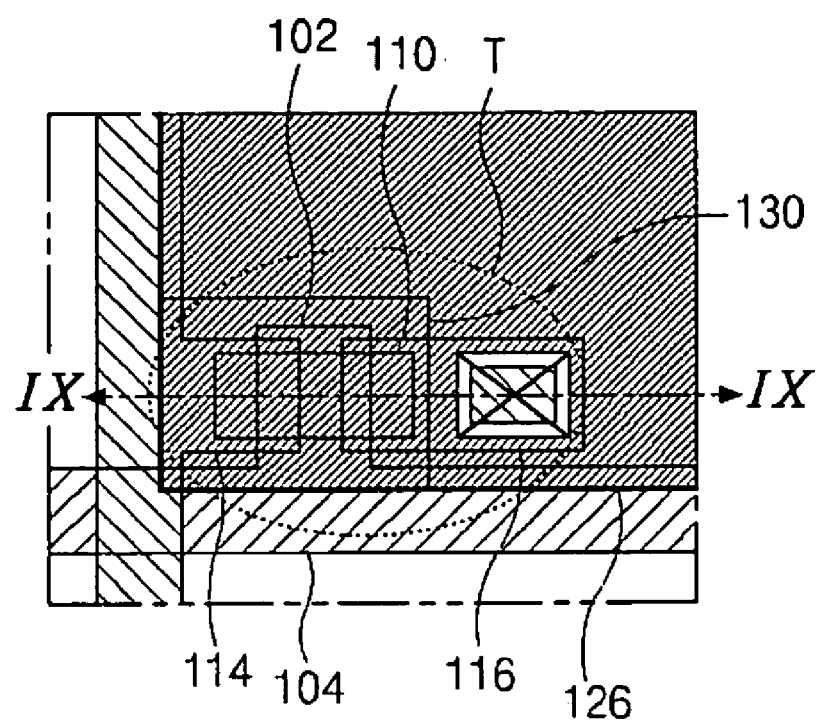
FIG. 8 is an enlarged plan view illustrating a portion S of FIG. 8.

FIG. 7 is a plan view illustrating a transflective LCD device according to a first embodiment of the present invention, and FIG. 8 is an enlarged plan view illustrating a portion S of FIG. 8.

As shown in FIG. 7, a plurality of unit pixels P is defined in a substrate 100, and each unit pixel P has first to fourth sub-pixel regions A1–A4 each of that has a transmissive portion B and a reflective portion D. Unlike the previously shown related art, the transmissive portion B is located at one corner of each of the first to fourth sub-pixel regions A1–A4. The transmissive portions B of the first to fourth sub-pixel regions A1–A4 are gathered at the center of the unit pixel P. Namely, the transmissive portions B are close together in the middle of the unit pixel P, and the reflective portions D surround the transmissive potions B in the unit pixel P.

Still referring to FIG. 7, gate lines 104 are horizontally disposed over the substrate 100, and data lines 118 are longitudinally disposed over the substrate perpendicularly crossing the gate lines 104. Two gate lines 104 are located side by side with each other such that those two gate lines 104 constitute twin gate lines. In the same manner, two data lines 118 are also located side by side with each other and constitute twin data lines. Pairs of the twin gate and data lines 104 and 118 define the unit pixel P. In the present invention, the gate and data lines 104 and 118 are not substantially present in the areas of the unit pixel P bounded by pairs of the first to fourth sub-pixel regions A1–A4.

A storage line 106 is formed parallel with the gate lines 104 across the middle of the unit pixel P. The storage line 106 perpendicularly crosses the data lines 118 and is located in a borderline between the upper sub-pixel regions A1–A2 and the lower sub-pixel regions A3–A4. Each transparent pixel electrode 130 corresponds to each of the sub-pixel regions A1–A4, and overlaps a portion of the storage line 106. Thus, the overlapped portion of the transparent pixel electrode 130 constitutes a storage capacitor $C_{ST}$ with the overlapped portion of the storage line 106. Each of the sub-pixel regions A1–A4 has one storage capacitor $C_{ST}$. Near a crossing of the twin gate and data lines 104 and 118, thin film transistors T are disposed. Each of the sub-pixel regions A1–A4 has the thin film transistor T at one corner thereof near the crossing of the gate and data lines 104 and 118.

As shown in FIG. 8, each thin film transistor T includes a gate electrode 102 extending from the gate line 104, an active layer 110 of amorphous silicon, a source electrode 114 extending from the data line 118 over the active layer 110, and a drain electrode 116 spaced apart from the source electrode 114.

In each of the sub-pixel regions A1–A4, a reflector 126 is disposed. An area where the reflector 126 is located is defined as the reflective portion D, while the other regions where the reflector 126 is not located is defined as the transmissive portion B. Namely, the reflector 126 is formed only within the reflective portion D.

Figure 1:
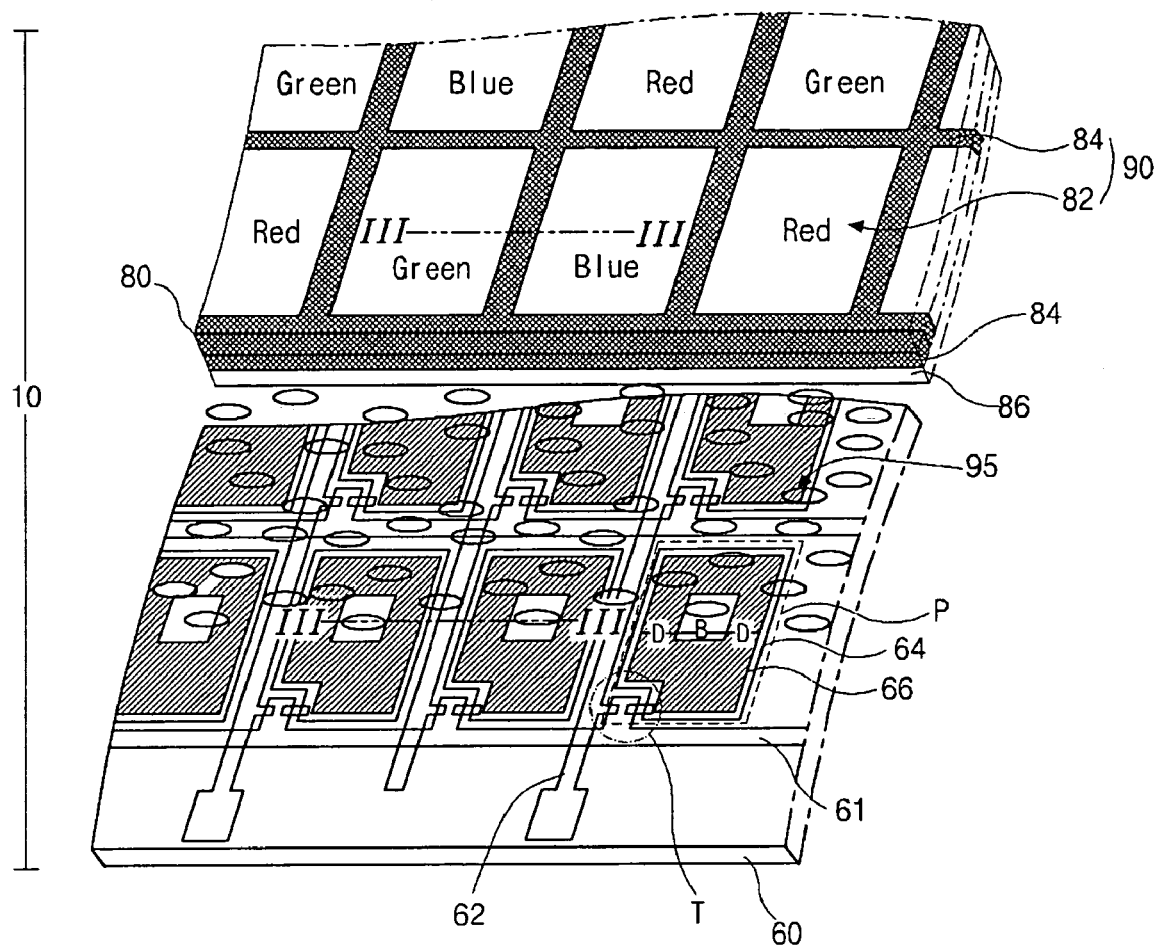
FIG. 1 shows a related art transflective liquid crystal display (LCD) device.
Figure 2:
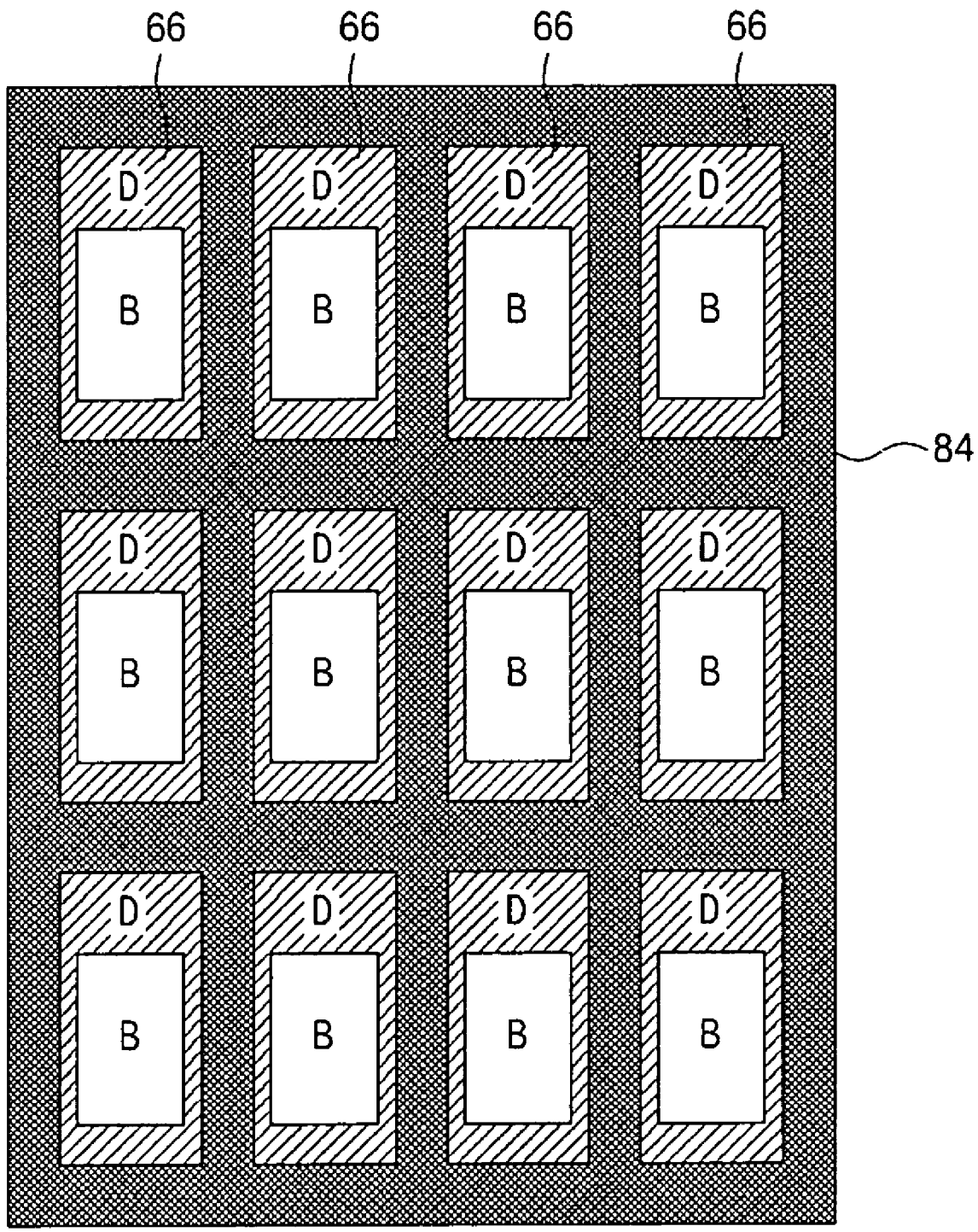
FIG. 2 is a plan view showing the related art transflective LCD device of FIG. 1.
Figure 3:
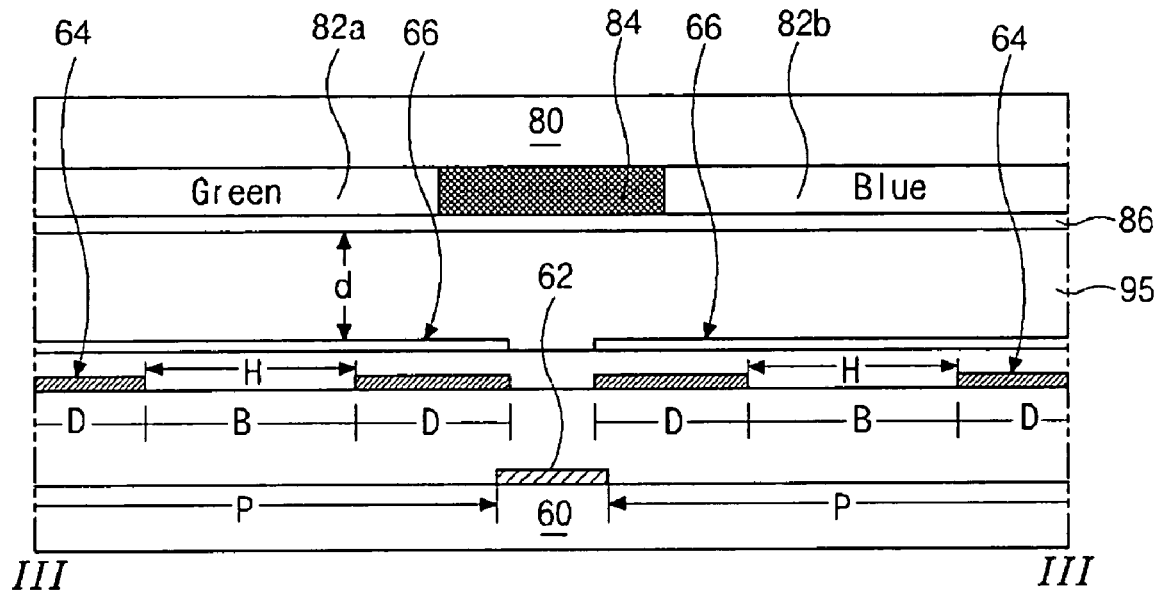
FIG. 3 is a cross sectional view taken along a line III—III of FIG. 1 and illustrates a transflective LCD device according to a related art.
Figure 4:
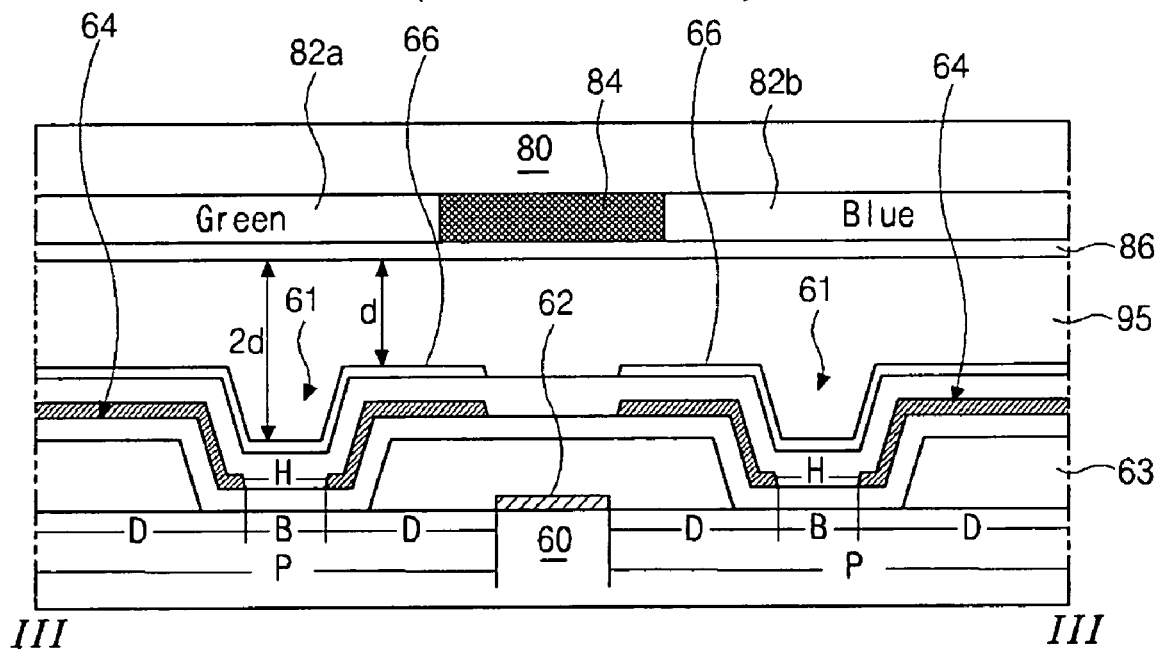
FIG. 4 is a cross sectional view taken along a line III—III of FIG. 1 and illustrates the transflective LCD device according to another related art.
Figure 5:
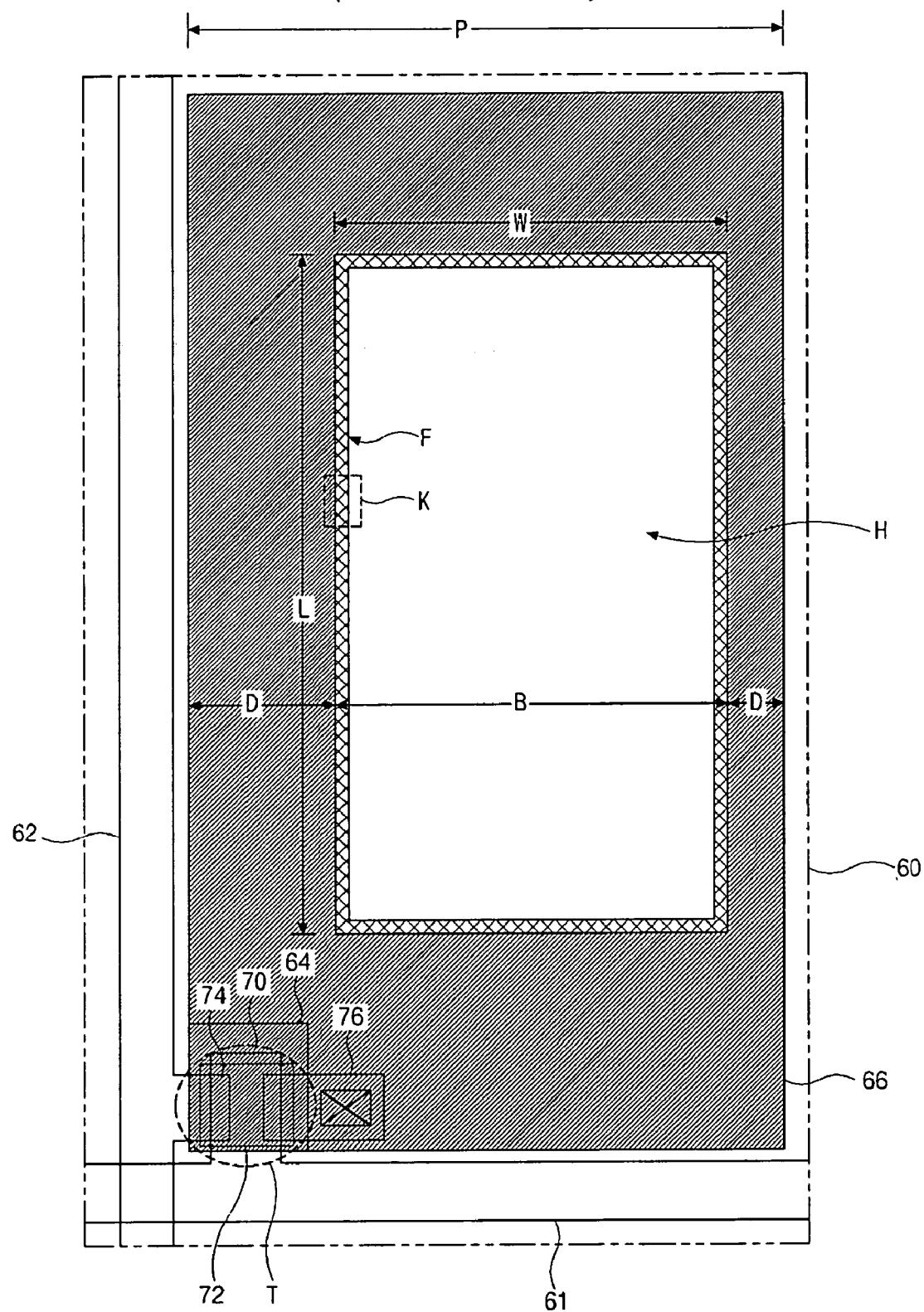
FIG. 5 is a plan view illustrating one sub-pixel of an array substrate for use in a transflective LCD device according to a related art.
Figure 6:
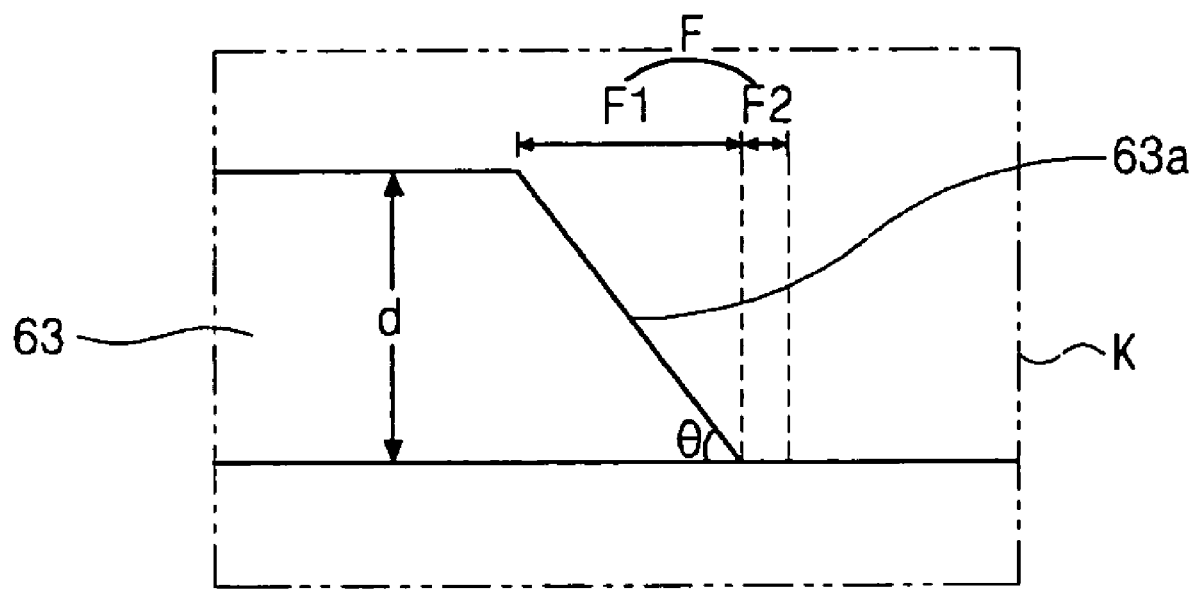
FIG. 6 is an enlarged cross section view illustrating a portion K of FIG. 5.

As described before, the transmissive portions B of the first to fourth sub-pixel regions A1–A4 are disposed in adjacent corners of each sub-pixel region that form the center of the unit pixel P. The corners of the sub-pixel regions in which the transmissive portions B are disposed is diametrically opposed to the corners in which the thin film transistors T are disposed. In the related art shown in FIG. 5, the transmissive potion B is disposed in the center of the pixel region P that is undivided into sub-pixel regions. Thus, the structure of FIG. 7 permits the border area between the reflective portion D and the transmissive portion B within each sub-pixel region to be cut in half compared to the related art. Furthermore, in the present embodiments, since the transmissive portions B are disposed in the center of the unit pixels P, the marginal value in forming the array elements is enlarged. Namely, since the border area between the reflective portion D and the transmissive portion B decreases to half the amount of the related art, the aperture ratio is increased accordingly. Additionally, since the transmissive portions B are gathered together, the transmissive portion is relatively extended and the rubbing process can be easily applied to the transmissive portions, unlike the transmissive portions of the related art. Also, the transparent pixel electrode 130 and the reflector 126 extend over the gate and data lines such that the aperture area in the transflective LCD device are increased in correspondence with the overlapped area.

FIGS. 9A–9E are cross sectional views taken along a line IX—IX of FIG. 8 and illustrates the fabrication process steps of an amorphous thin film transistor. FIGS. 10A–10E are cross sectional views taken along a line X—X of FIG. 7 and illustrate the fabrication process steps of sub-pixels. And FIGS. 11A–11E are cross sectional views respectively taken along a line XI—XI of FIG. 7 and illustrates the fabricating process steps of a unit pixel.

Figure 9A:
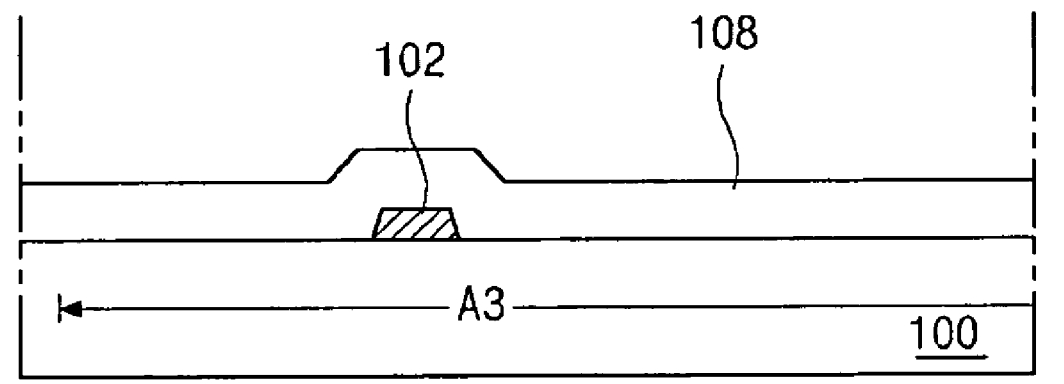
FIGS. 9A–9E are cross sectional views taken along a line IX—IX of FIG. 8 and illustrates the fabrication process steps of a amorphous thin film transistor.

Referring to FIGS. 9A, 10A and 11A, a plurality of sub-pixel regions A1–A4 are defined in a substrate 100. Each of the sub-pixel regions A1–A4 includes a reflective portion D and a transmissive portion B. As described before, the first to fourth sub-pixel regions A1–A4 constitute a unit pixel P. As shown in FIG. 7, the first to forth sub-pixel regions A1–A4 are disposed in up-and-down and right-and-left directions within the unit pixel P. Further, the transmissive portions B of the first to fourth sub-pixel regions A1–A4 are also disposed in up-and-down and right-and-left directions in the center of the unit pixel P. These structures form a transmissive portion group in the center of the unit pixel P.

After defining the sub-pixel regions A1–A4 each having the transmissive and reflective portions B and D, a first metallic material including aluminum (Al) is deposited on the substrate 100 and then patterned to form a gate electrode in each of the sub-pixel regions A1–A4, gate lines 104 and a storage line 106. The gate lines 104 are disposed side by side along outer top lines of the first and second sub-pixel regions A1 and A2 and along outer bottom liners A3 and A4, such that neighboring two gate lines 104 constitute twin gate lines. The storage line 106 is parallel with the gate lines 104 and is disposed in between the first and third sub-pixel regions A1 and A3 and in between the second and fourth sub-pixel regions A2 and A4. The twin gate lines 104 separate two neighboring pixels P and run in an up-and-down direction as illustrated in FIG. 7.

The aluminum-basic metallic material is used for the first metallic layer to decrease or prevent signal delay. Alternatively, a double layer structure including a lower layer having aluminum and an upper layer having high chemical resistance characteristics can be utilized to protect the chemically weak aluminum-based metallic material.

After patterning the first metallic layer, a gate insulating layer 108 is formed on the substrate 100 to cover the gate electrode 102, the twin gate lines 104 and the storage line 106, as shown in FIGS. 9A, 10A and 11A. The gate insulating layer 108 may be formed from an inorganic material, for example, silicon nitride ($SiN_x$) and silicon oxide ($SiO_2$).

Figure 9B:
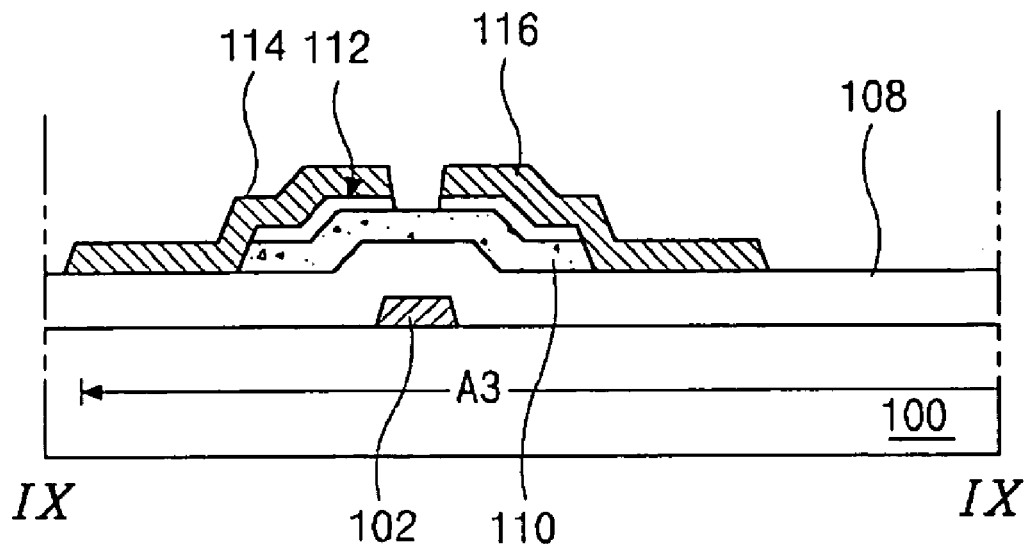

Now in FIGS. 9B, 10B and 11B, an intrinsic amorphous silicon (a-Si:H) layer and an extrinsic amorphous silicon (n+ a-Si:H) layer are sequentially formed on the gate insulating layer 108 and then pattern to form an active layer 110 and an ohmic contact layer 112 over the gate electrode 102. The active layer 110 is the intrinsic amorphous silicon layer, and the ohmic contact layer 112 is the extrinsic amorphous silicon layer. After forming the active and the ohmic contact layers 110 and 112, a second metallic material (e.g., chromium (Cr), molybdenum (Mo), copper (Cu), tungsten (W), titanium (Ti), tantalum (Ta) or the like) is deposited on the gate insulating layer 108 to cover the active and ohmic contact layers 110 and 112. And then, the second metallic layer is patterned to form source and drain electrodes 114 and 116 (as shown in FIG. 9B) and data lines 118 (as shown in FIG. 10B). Although not shown in FIGS. 9B, 10B and 11B, but shown in FIG. 7, the data lines 118 are perpendicular to the gate lines 104. Two of the data lines 118 are disposed side by side and form twin data lines. Pairs of the twin gate and data lines 104 and 118 surround the unit pixel P.

The source electrode 114 extends from the data line 118 and is in contact with the underlying ohmic contact layer 112. The drain electrode 116 is spaced apart from the source electrode 114 and is also in contact with the underlying ohmic contact layer 112. After forming the source and drain electrodes 114 and 116, a portion of the ohmic contact layer 112 exposed between the source and drain electrodes 114 and 116 is removed using the source and drain electrodes 114 and 116 as masks, thereby revealing a portion of the active layer 110.

Figure 9C:
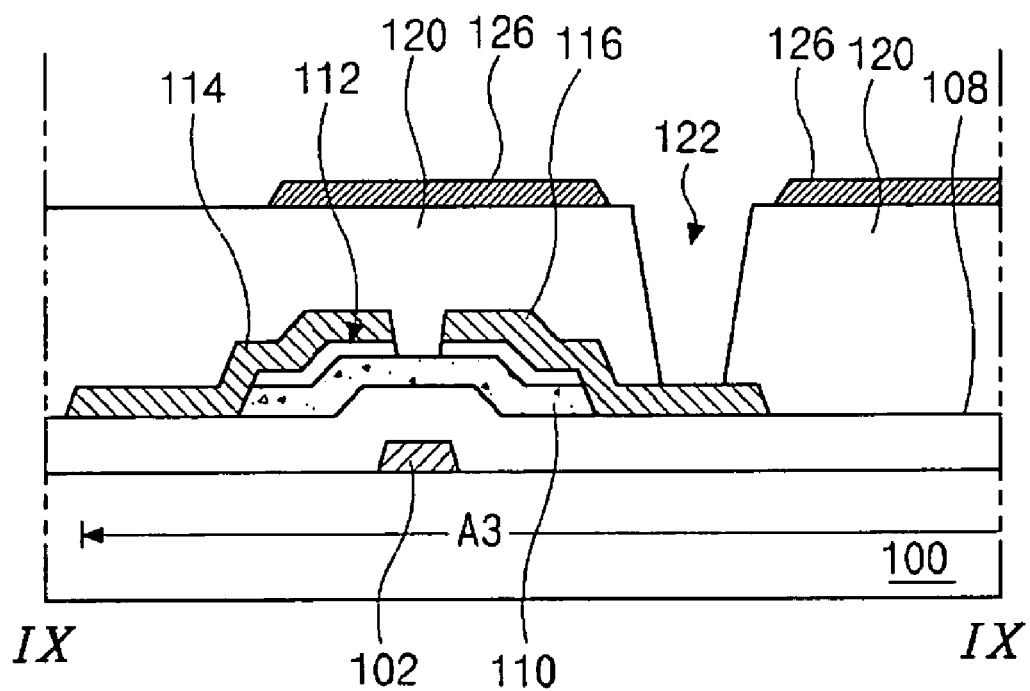
Figure 10C:
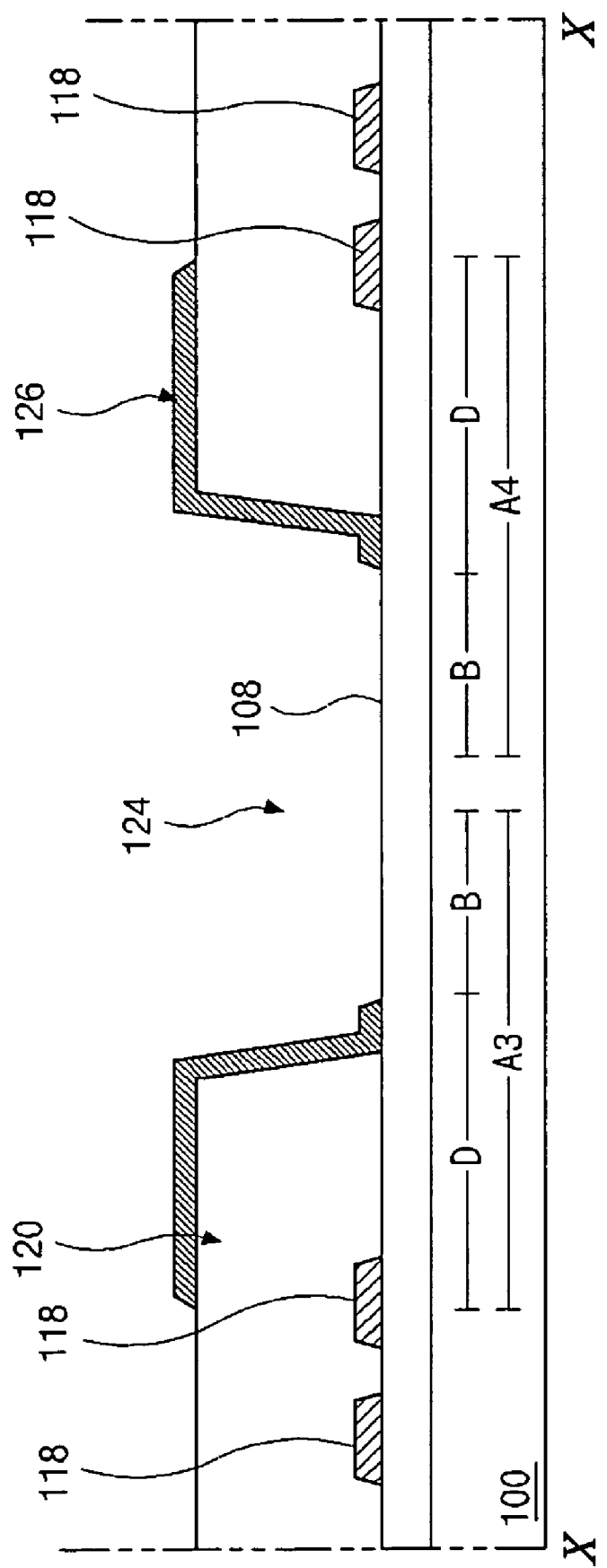
Figure 11C:
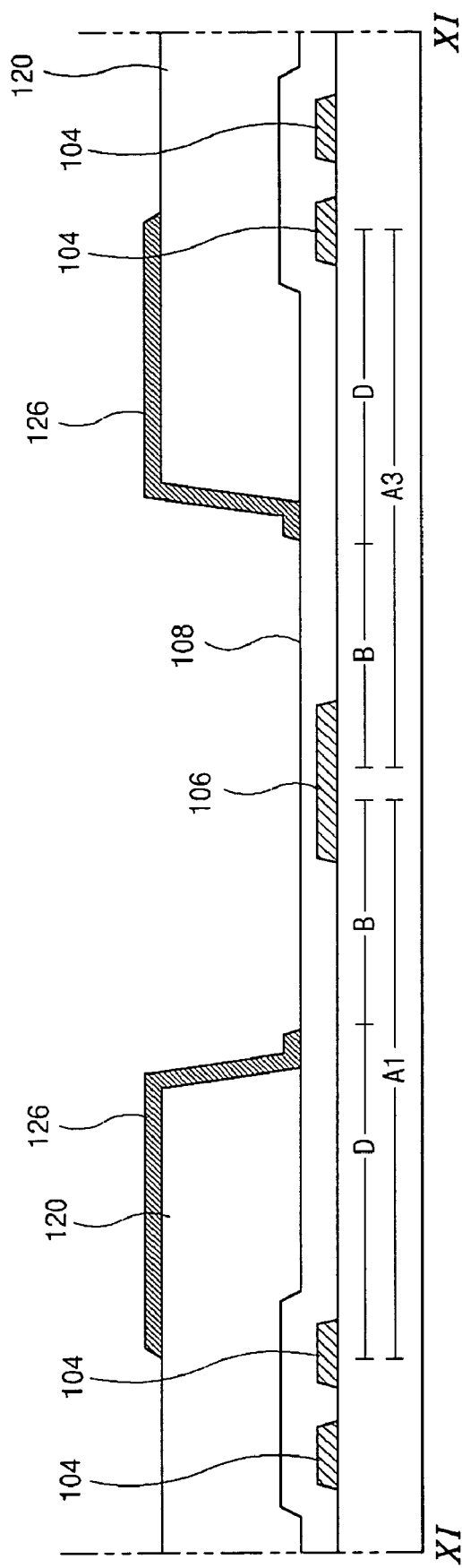

In FIGS. 9C, 10C and 11C, a first passivation layer 120 is formed over an entire of the substrate 100 so that the first passivation layer 120 covers the data lines 118 and the source and drain electrodes 114 and 116. The first passivation layer 120 may be an organic material, for example, benzocyclobutene (BCB) or acrylic resin. When forming the first passivation layer 120, such an organic material may be repeatedly applied and coated over the substrate 100 in order to obtain a desired thickness. Although not shown in FIGS. 9C, 10C and 11C, an inorganic material, e.g., silicon nitride ($SiN_x$) or silicon oxide ($SiO_2$), which covers the source and drain electrodes 114 and 116 and the data lines 118, may be formed underneath the first passivation layer 120.

After forming the first passivation layer 120, a contact hole process is conducted. The first passivation layer 120 is patterned to form a first contact hole 122 exposing a portion of the drain electrode 116. At this time, in the middle of the unit pixel P, the first passivation layer 120 also has a first opening 124 that exposes the transmissive portions B of the first to fourth sub-pixel regions A1–A4. After patterning the first passivation layer 120, a third metallic material having a superior reflectivity is deposited on the first passivation layer 120 and then patterned to form reflectors 126 within the reflective portions D of the first to fourth sub-pixel regions A1–A4. As shown in FIG. 9C, the reflector 126 covers the thin film transistor T. The third metallic material may include aluminum (Al).

Figure 9D:
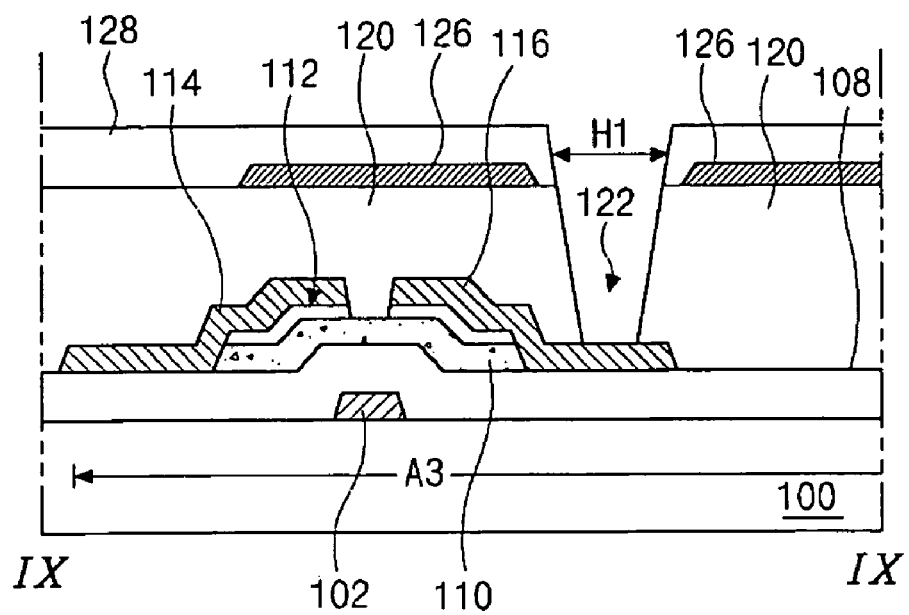
Figure 11D:
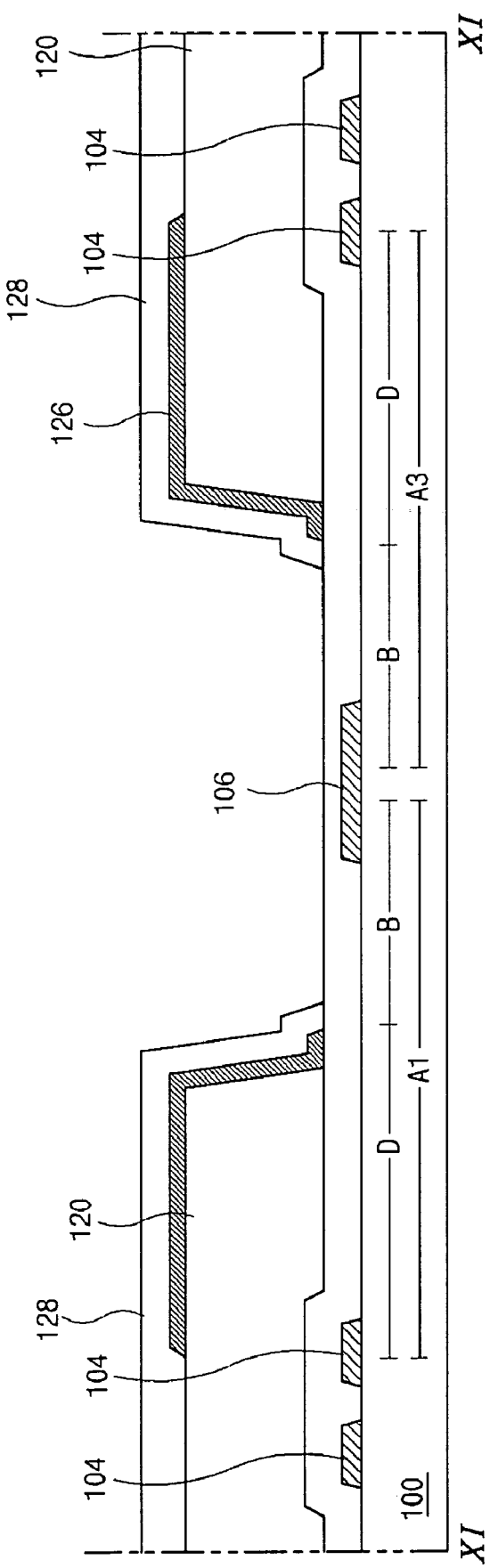

In FIGS. 9D, 10D and 11D, an inorganic material of silicon nitride ($SiN_x$) or silicon oxide ($SiO_2$), for example, is deposited over an entire of the substrate 100 to cover the reflectors 116. The deposited inorganic material becomes a second passivation layer 128, and then it is patterned to for a second contact hole H1 that corresponds to the previously-formed first contact hole 122 and exposes the drain electrode. During the patterning process of the second passivation layer 128, a second opening H2 is also formed in the area where the first opening 124 is formed such that the second opening H2 exposes a portion of the gate insulating layer 108 within the first opening area 124.

Figure 9E:
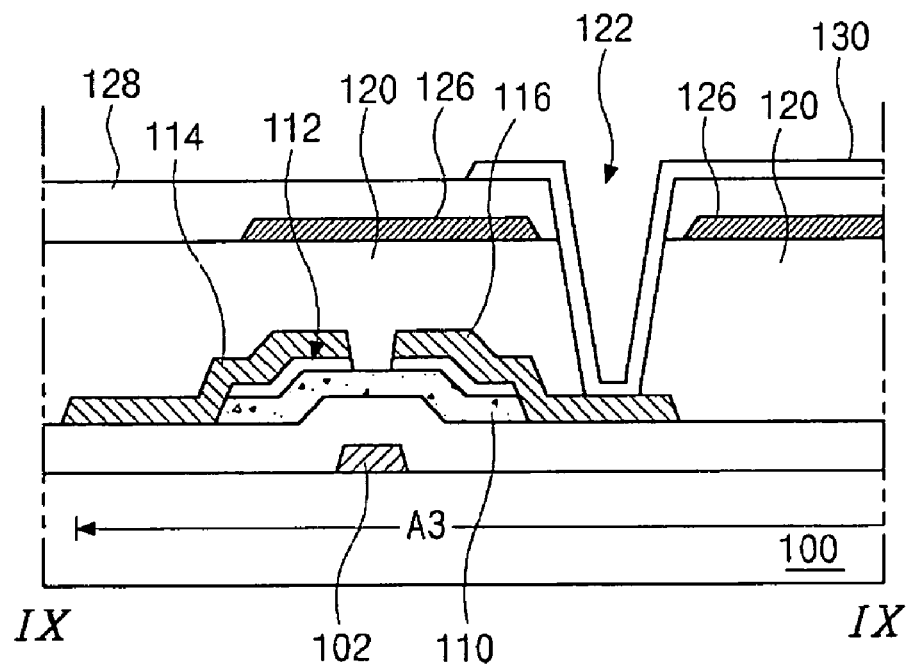
Figure 10E:
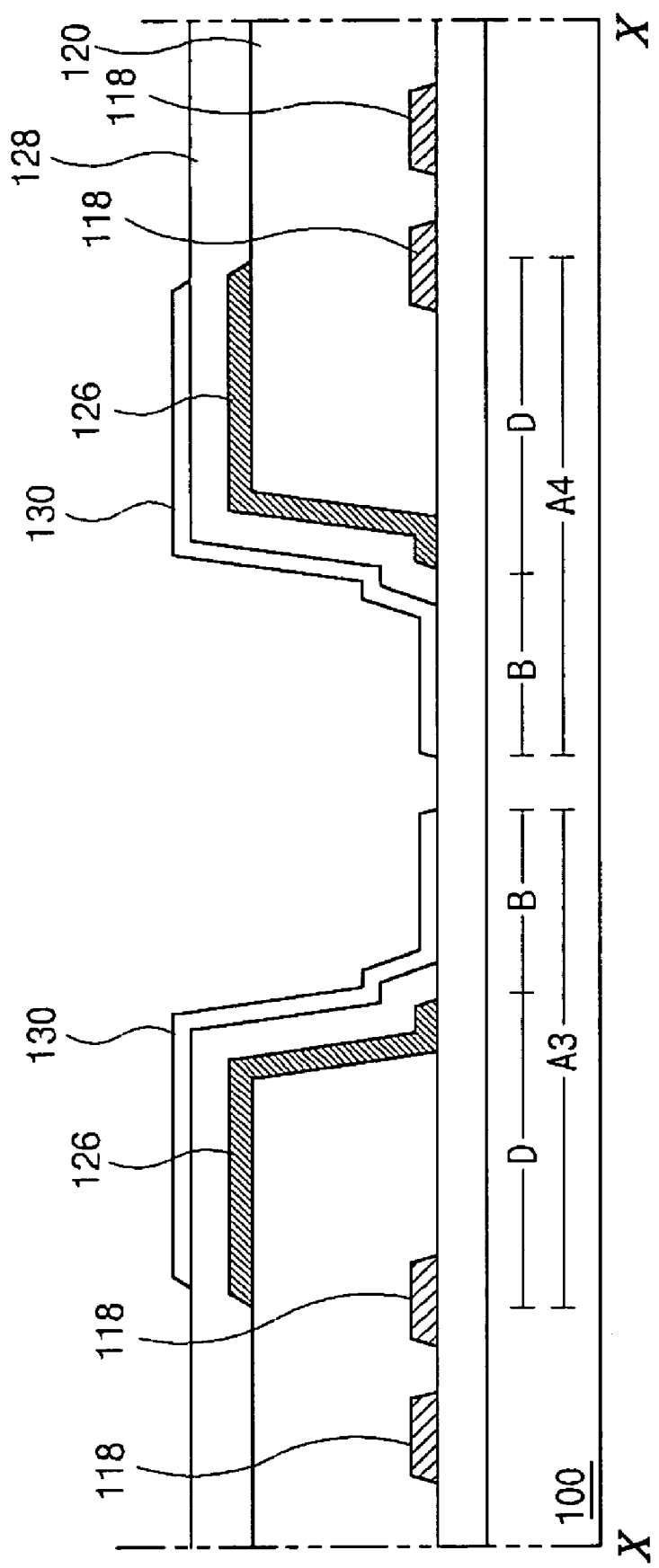

Next in FIGS. 9E, 10E and 11E, a transparent conductive material is deposited over an entire of the substrate 100 having the second passivation layer 128. And then the transparent conductive material is patterned to form transparent pixel electrodes 130 in the first to fourth sub-pixel regions A1–A4. Each transparent pixel electrode 130 is disposed within each of the first to fourth sub-pixel regions A1–A4, and contacts the drain electrode 116 through the drain contact hole 122. Furthermore, each transparent pixel electrode 130 overlaps a portion of the storage line 106 and also portions of the gate and data lines 104 and 118. The portion of the transparent pixel electrode 130 overlapping the storage line 106 forms a storage capacitor $C_{ST}$ with the overlapped portion of the storage line 106.

As described hereinbefore, the transflective LCD device is fabricated according to the first embodiment of the present invention. Although the reflector 126 does not contact with the drain electrode 116, it is possible to connect the reflector 126 to the drain electrode 116.

Figure 12:
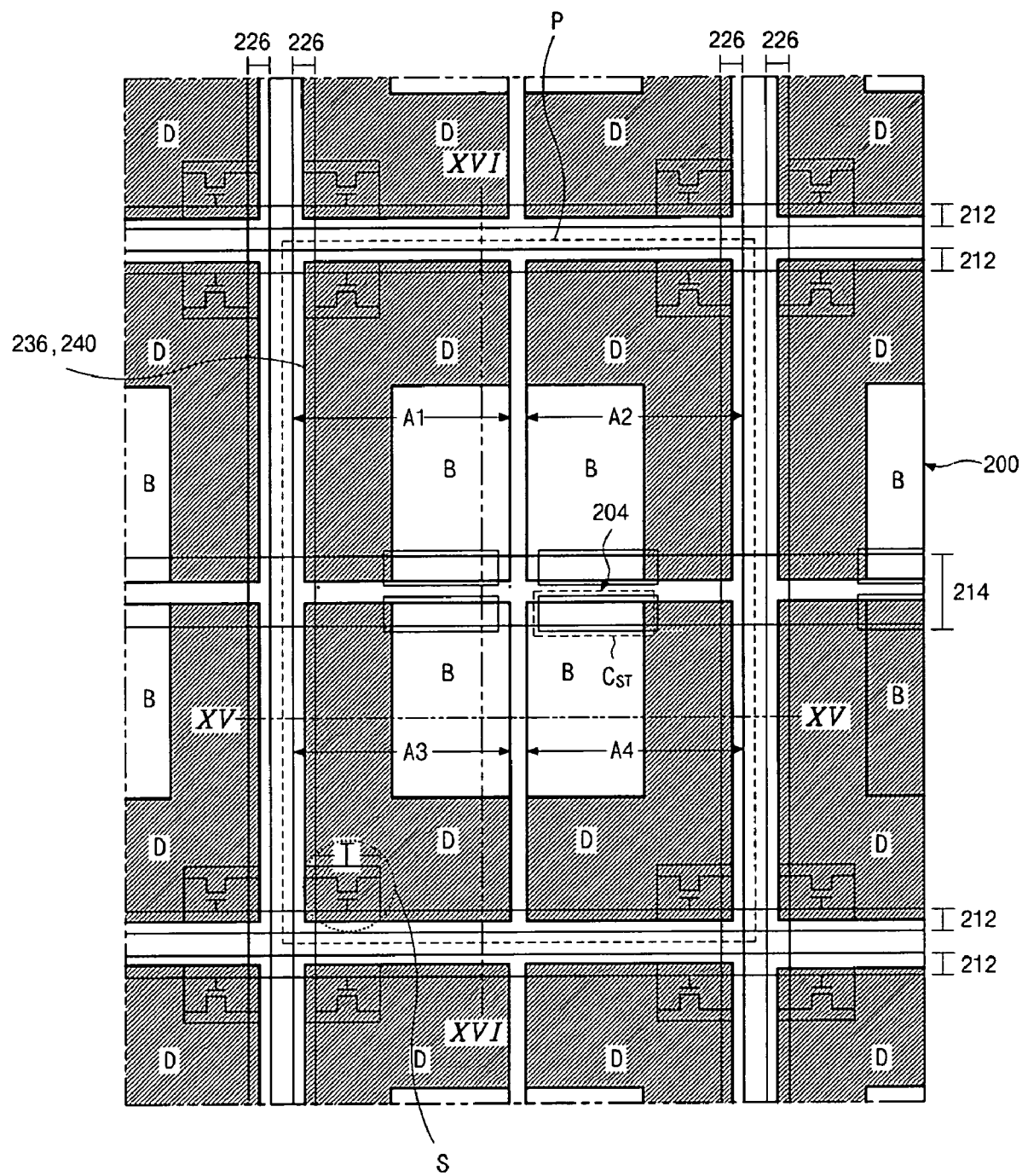
FIG. 12 is a plan view illustrating a transflective LCD device according to a second embodiment of the present invention.
Figure 13:
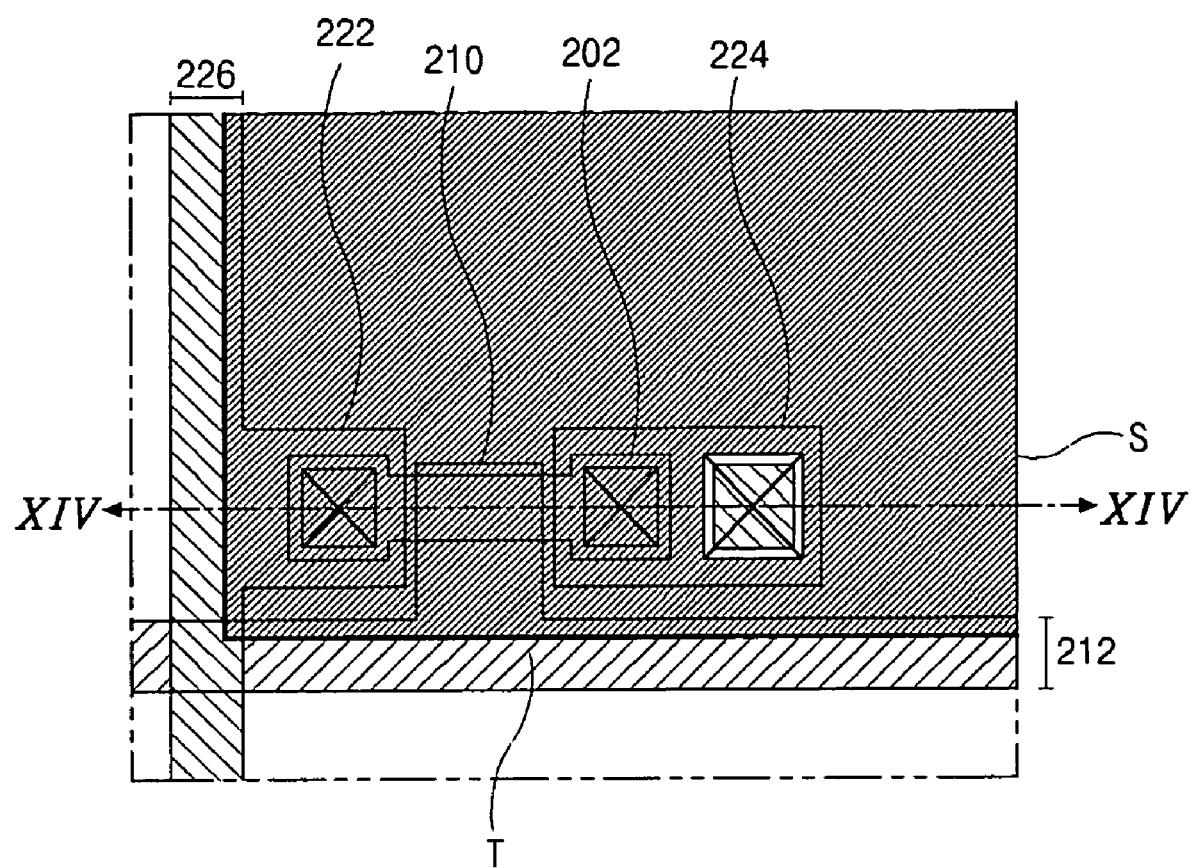
FIG. 13 is an enlarged plan view illustrating a portion S of FIG. 12.

FIG. 12 is a plan view illustrating a transflective LCD device according to a second embodiment of the present invention, and FIG. 13 is an enlarged plan view illustrating a portion S of FIG. 12. Although FIG. 12 is very similar to FIG. 7, the transflective LCD device has a different thin film transistor according to the second embodiment.

As shown in FIG. 12, a plurality of unit pixels P is defined in a substrate 200, and each unit pixel P has first to fourth sub-pixel regions A1–A4 each of that has a transmissive portion B and a reflective portion D. Like the first embodiment shown in FIG. 7, the transmissive portion B is located at one corner of each of the first to fourth sub-pixel regions A1–A4. The transmissive portions B of the first to fourth sub-pixel regions A1–A4 are gathered at the center of the unit pixel P. Namely, the transmissive portions B are close together in the middle of the unit pixel P, and the reflective portions D surround the transmissive potions B within the unit pixel P.

In FIG. 12, gate lines 212 are horizontally disposed over the substrate 200, and data lines 226 are longitudinally disposed over the substrate perpendicularly crossing the gate lines 212. Two gate lines 212 are located side by side with each other such that those two gate lines 212 constitute twin gate lines. In the same manner, two data lines 226 are also located side by side with each other and constitute twin data lines. Pairs of the twin gate and data lines 212 and 226 define the unit pixel P. As in FIG. 7, the gate and data lines 212 and 226 surround but are not substantially present within the unit pixel P, that is the gate and data lines 212 and 226 are not substantially present in the areas between the first to fourth sub-pixel regions A1–A4 of one unit pixel P.

A storage line 214 is formed parallel with the gate lines 212 across the middle of the unit pixel P. The storage line 214 perpendicularly crosses the data lines 226 and is located in a borderline between the upper sub-pixel regions A1–A2 and the lower sub-pixel regions A3–A4. Polysilicon patterns 204 are disposed underneath the storage line 214 and each polysilicon pattern 204 corresponds to each of the sub-pixel regions A1–A4. The storage line 213 and the underlying polysilicon patterns 204 may constitute storage capacitors $C_{ST}$. Each transparent pixel electrode 240 is in correspondence to each of the sub-pixel regions A1–A4, and overlaps a portion of the storage line 214. Thus, the overlapped portion of the transparent pixel electrode 240 constitutes a storage capacitor $C_{ST}$ with the overlapped portion of the storage line 214. Each of the sub-pixel regions A1–A4 has one storage capacitor $C_{ST}$. Near a crossing of the twin gate and data lines 212 and 226, thin film transistors T are disposed. Each of the sub-pixel regions A1–A4 has the thin film transistor T at one corner thereof near the crossing of the gate and data lines 212 and 226.

Unlike the first embodiment, each thin film transistor T shown in FIG. 12 includes a gate electrode 210 extending from the gate line 212, a polycrystalline silicon layer 202 under the gate electrode 210, a source electrode 222 extending from the data line 226 over one end portion of the polycrystalline silicon layer 202, and a drain electrode 224 spaced apart from the source electrode 222 over the other end portion of the polycrystalline silicon layer 202.

In each of the sub-pixel regions A1–A4, a reflector 236 is disposed in a manner similar to the first embodiment. An area where the reflector 236 is located is defined as the reflective portion D, while the other region where the reflector 236 is not located is defined as the transmissive portion B. Namely, the reflector 236 is formed only within the reflective portion D.

As described before, the transmissive portions B of the first to fourth sub-pixel regions A1–A4 gather together in the center of the unit pixel P. The sub-pixel region includes the transmissive potion B at one corner thereof opposite to the thin film transistor T, and thus the transmissive portion B is located next to the other transmissive portions of the neighboring sub-pixel regions within the unit pixel P. This structure, in which the transmissive portions B are gathered, decreases the border area between the reflective portion D and the transmissive portion B within each sub-pixel region by one half compared to the related art shown in FIG. 5. Furthermore, since the transmissive portions B are disposed together in the center of the unit pixel P, the marginal value in forming the array elements is enlarged. Namely, since the border area between the reflective portion D and the transmissive portion B decreases by half compared to the related art, the aperture ratio is correspondingly increased. Additionally, since the transmissive portions B are gathered, together, the transmissive portion of the unit pixel is relatively extended and the rubbing process can be easily applied to the transmissive portions, unlike the related art. The transparent pixel electrode 240 and the reflector 236 in the second embodiment extend over the gate and data lines such that the aperture area in the transflective LCD device increases in correspondence with the overlapped area.

FIGS. 14A–14F are cross sectional views taken along a line XIV—XIV of FIG. 13 and illustrates the fabrication process steps of a polysilicon thin film transistor. FIGS. 15A–15F are cross sectional views taken along a line XV—XV of FIG. 12 and illustrate the fabrication process steps of sub-pixels. And FIGS. 16A–16F are cross sectional views respectively taken along a line XVI—XVI of FIG. 12 and illustrates the fabricating process steps of a unit pixel.

Figure 14A:
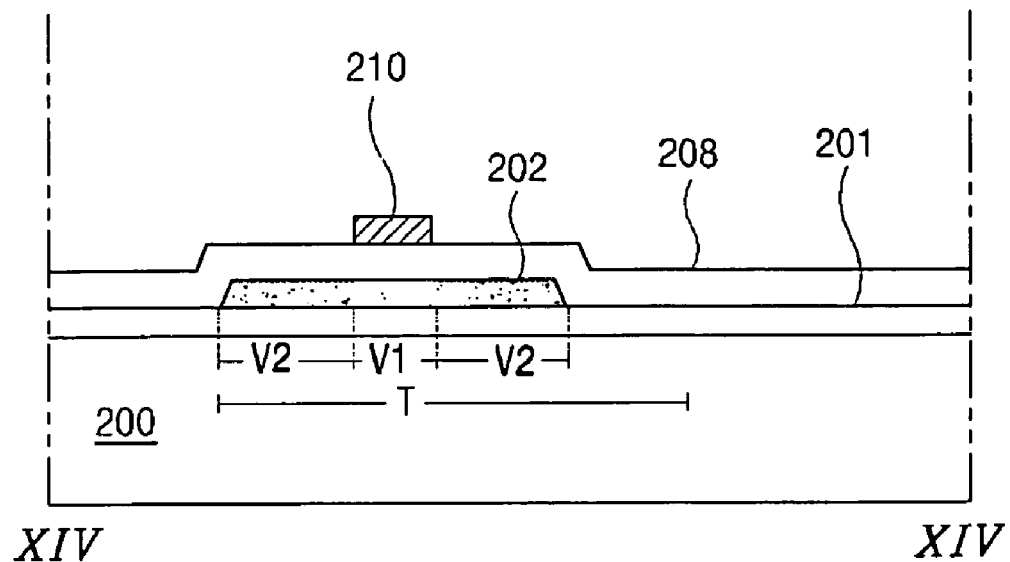
FIGS. 14A–14F are cross sectional views taken along a line XIV—XIV of FIG. 13 and illustrates the fabrication process steps of a polysilicon thin film transistor.
Figure 15D:
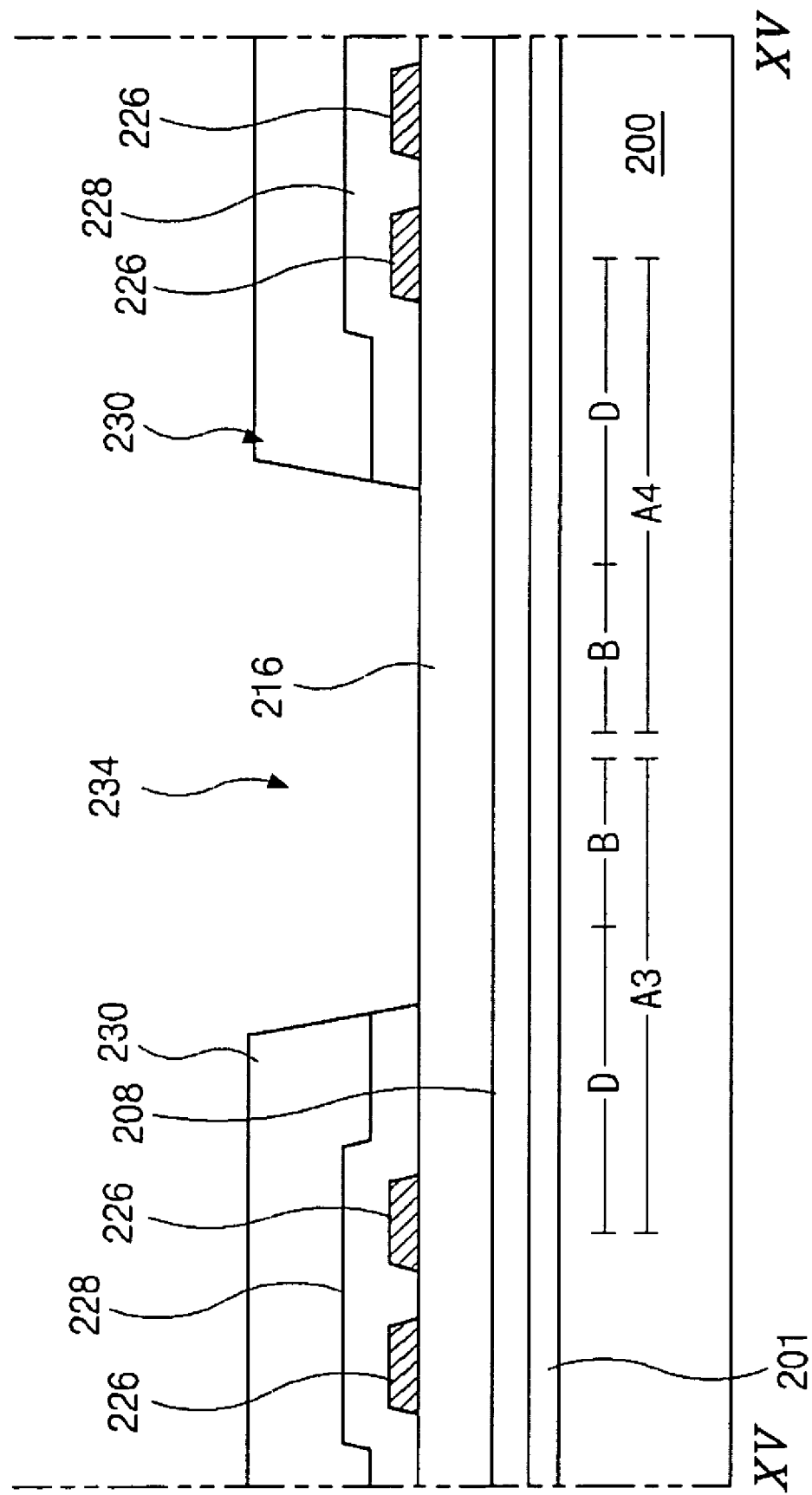
Figure 16A:
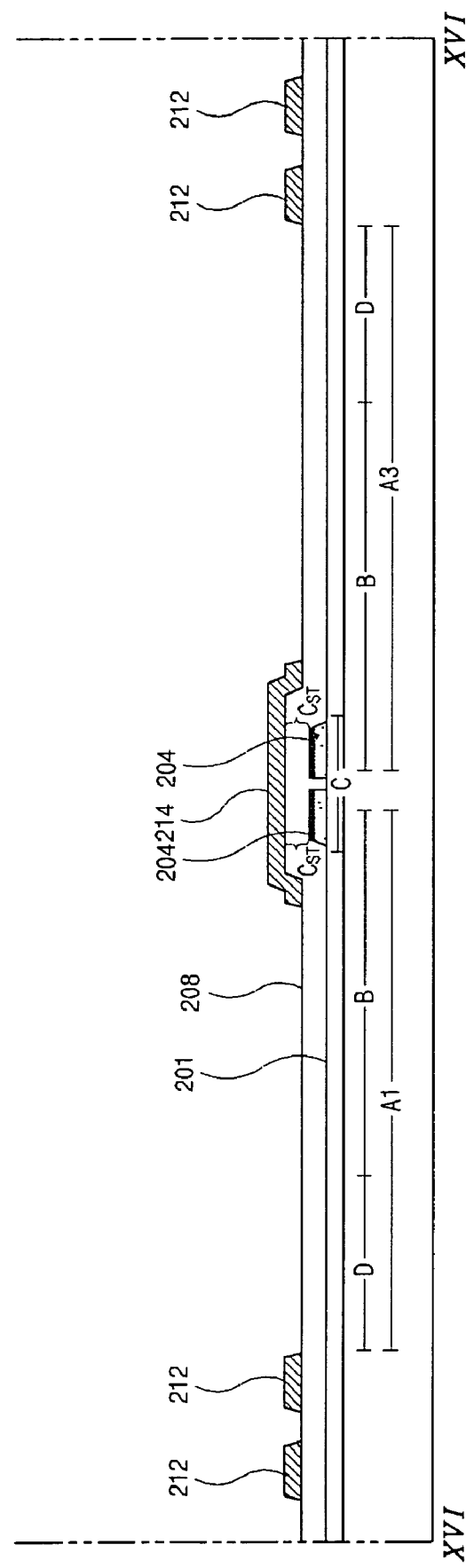

Referring to FIGS. 14A, 15A and 16A, a plurality of sub-pixel regions A1–A4 are defined in a substrate 200. Each of the sub-pixel regions A1–A4 includes a reflective portion D and a transmissive portion B. As described before, the first to fourth sub-pixel regions A1–A4 constitute a unit pixel P. As shown in FIG. 12, the first to forth sub-pixel regions A1–A4 have a checkered pattern arrangement, being disposed in longitudinal and lateral directions within the unit pixel P. Further, the transmissive portions B of the first to fourth sub-pixel regions A1–A4 are also disposed in longitudinal and lateral directions in the center of the unit pixel P. These structure forms a transmissive portion group in the center of the unit pixel P.

After defining the sub-pixel regions A1–A4 each having the transmissive and reflective portions B and D, a buffer layer 201 is formed on the entire substrate 200 by depositing silicon nitride ($SiN_x$) or silicon oxide ($SiO_2$). If the substrate 200 includes alkali materials therein, the buffer layer 201 prevents such alkali materials from diffusing into layers overlying the buffer layer 201. After forming the buffer layer 201, a polycrystalline silicon layer is formed on the buffer layer 201 and then patterned to form a first polysilicon pattern 202 in a thin film transistor area T and second polysilicon patterns 204 in a storage area C. The polycrystalline silicon layer may be formed by depositing amorphous silicon on the buffer layer 201 and then by crystallizing it using a thermal treatment. The first polysilicon pattern 202 is divided into a first region V1 (i.e., active region) and second regions V2 (i.e., source and drain regions, respectively). Dopants (either n+ or p+ type) are applied to the second silicon patterns 204 in the storage area C such that the second silicon patterns 204 acts as one electrode of the storage capacitor.

Thereafter, an inorganic insulating material, e.g., silicon nitride ($SiN_x$) or silicon oxide ($SiO_2$), is deposited over the entire substrate 200 to cover the first and second polysilicon patterns 202 and 204, thereby forming a gate insulating material 208. Then, a first metallic layer including aluminum (Al) is on the gate insulating layer 208 and then patterned to form a gate electrode 210 over the first polysilicon pattern 202. The gate electrode 210 corresponds in position to the active region V1 and has the same size as the active region V1. Gate lines 212 connected to the gate electrode 210 are formed at the same time the gate electrode 210 is formed. The gate lines 212 are disposed side by side along outer top lines of the first and second sub-pixel regions A1 and A2 and along outer bottom lines of the third and fourth sub-pixel regions A3 and A4, such that neighboring two gate lines 212 constitute twin gate lines. Furthermore, a storage line 214 is also formed when forming the gate electrode 210 and the gate lines 212. The storage line 214 is parallel with the gate lines 212 and is disposed in between the first and third sub-pixel regions A1 and A3 and in between the second and fourth sub-pixel regions A2 and A4. In the second embodiment, the storage line 214 overlaps the second polysilicon patterns 204 and thus constitutes storage capacitor $C_{ST}$ with the second polysilicon patterns 204. Further, the storage line 214 acts as a border between the upper sub-pixel group A1–A2 and the lower sub-pixel group A3–A4, while the twin gate lines 212 act as a border between the longitudinally disposed unit pixels P.

In the second embodiment, the aluminum-basic metallic material is used for the first metallic layer to prevent signal delay. Alternatively, a double layer structure including a lower layer having aluminum and an upper layer having high chemical resistance characteristics can be utilized to protect the chemically weak aluminum-based metallic material.

After patterning the first metallic layer to form the gate electrode 210, the gate lines 212 and the storage line 214, n+ or p+ type ions are applied to the first polysilicon pattern 202 using the gate electrode 210 as an ion stopper. Therefore, the source and drain regions V2 of the first polysilicon pattern 202 are doped by such impurities, for example, n+ or p+ type ions.

Figure 14B:
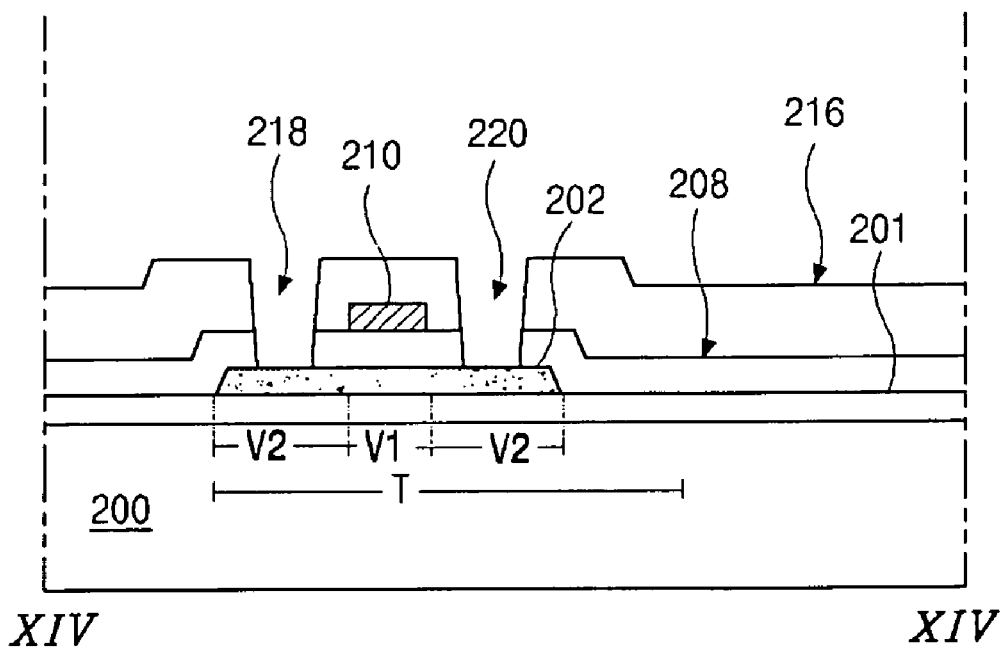

Now in FIGS. 14B, 15B and 16B, an interlayer insulator 216 is formed on the entire surface of the gate insulating layer 208 to cover the gate electrode 210, the gate lines 212 and the storage line 214. Like the gate insulating layer 208, the interlayer insulator 216 is also an inorganic material, such as silicon nitride ($SiN_x$) or silicon oxide ($SiO_2$). Thereafter, the interlayer insulator 216 and the underlying gate insulating layer 208 are simultaneously patterned to form a first contact hole 218 and a second contact hole 220 which expose the source and drain regions V2, respectively.

Figure 14C:
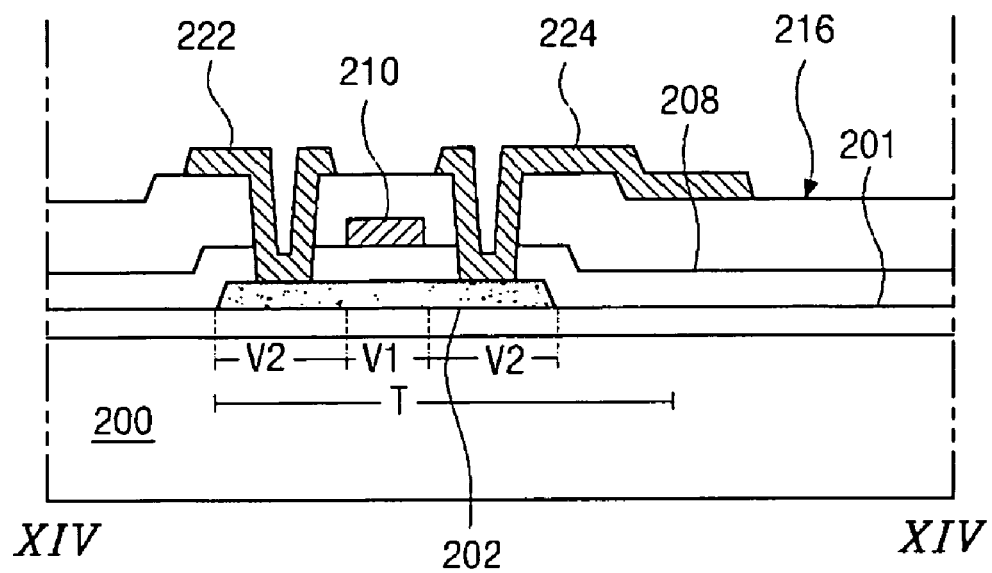
Figure 16C:
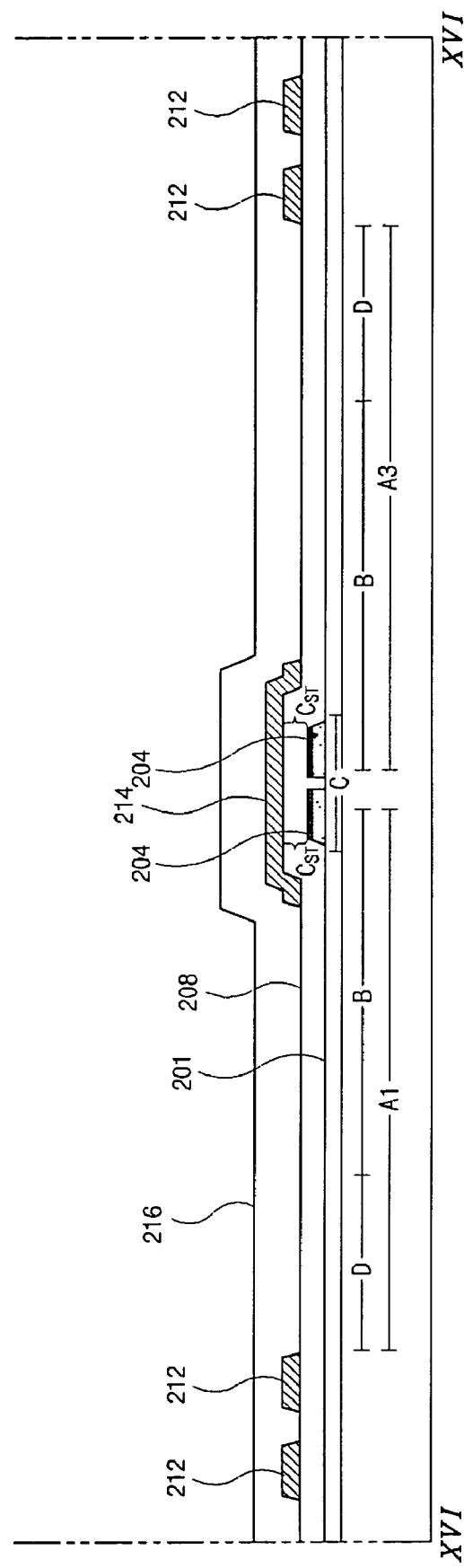

Next in FIGS. 14C, 15C and 16C, a second metallic material (e.g., chromium (Cr), molybdenum (Mo), copper (Cu), tungsten (W), titanium (Ti), tantalum (Ta) or the like) is deposited on the interlayer insulator 216, and then, the second metallic layer is patterned to form source and drain electrodes 222 and 224 (as shown in FIG. 14C) and data lines 226 (as shown in FIG. 15C). Although not shown in FIGS. 14C, 15C and 16C, but shown in FIG. 12, the data lines 226 cross the gate lines 212 perpendicularly, thereby defining the unit pixels P. Two of the data lines 226 are disposed side by side and form twin data lines. As described before, the unit pixel P defined by pairs of the twin gate and data lines 212 and 226 is divided into the first to fourth sub-pixel regions A1–A4. The source electrode 222 extends from the data line 226, and contacts the source region V2 through the first contact hole 218. The drain electrode 224 is spaced apart from the source electrode 222 across the gate electrode 210, and contacts the drain region V2 through the second contact hole 220.

Figure 14D:
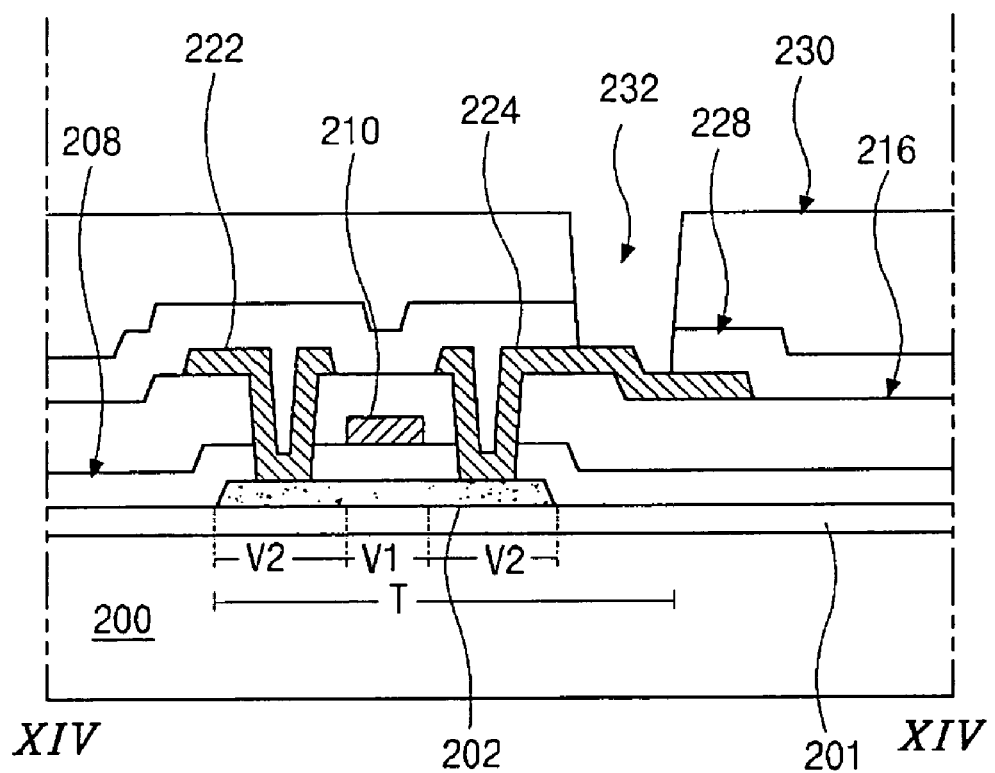
Figure 16D:
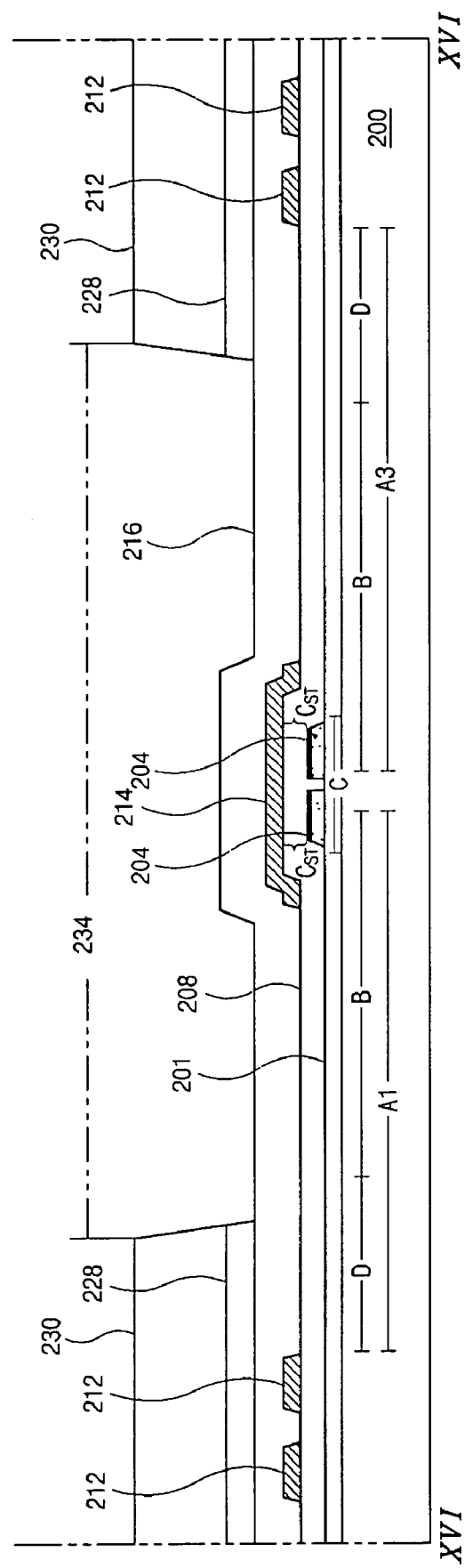

In FIGS. 14D, 15D and 16D, a first passivation layer 228 is formed over the entire substrate 220 so that the first passivation layer 228 covers the data lines 226 and the source and drain electrodes 222 and 224. The first passivation layer 228 is an inorganic material such as silicon nitride ($SiN_x$) and silicon oxide ($SiO_2$). After forming the first passivation layer 228, an organic material, for example, benzocyclobutene (BCB) or acrylic resin, is formed on the first passivation layer 228, thereby forming a second passivation layer 230. After that, the first and second passivation layers 228 and 230 are simultaneously patterned to form a third contact hole 232 that exposes a portion of the drain electrode 224. Additionally at this time of patterning the first and second passivation layers 228 and 230, an opening 234 is formed in the middle of the unit pixel P. The opening 234 exposes the interlayer insulator 216 in the middle portion of the unit pixel P and corresponds to all of the transmissive portions B.

Figure 14E:
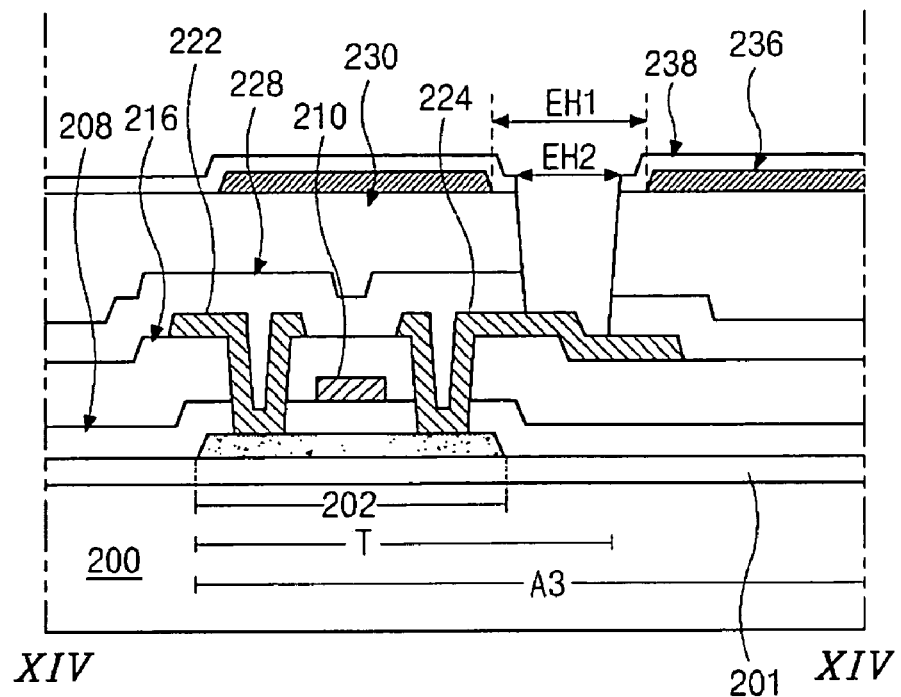
Figure 15E:
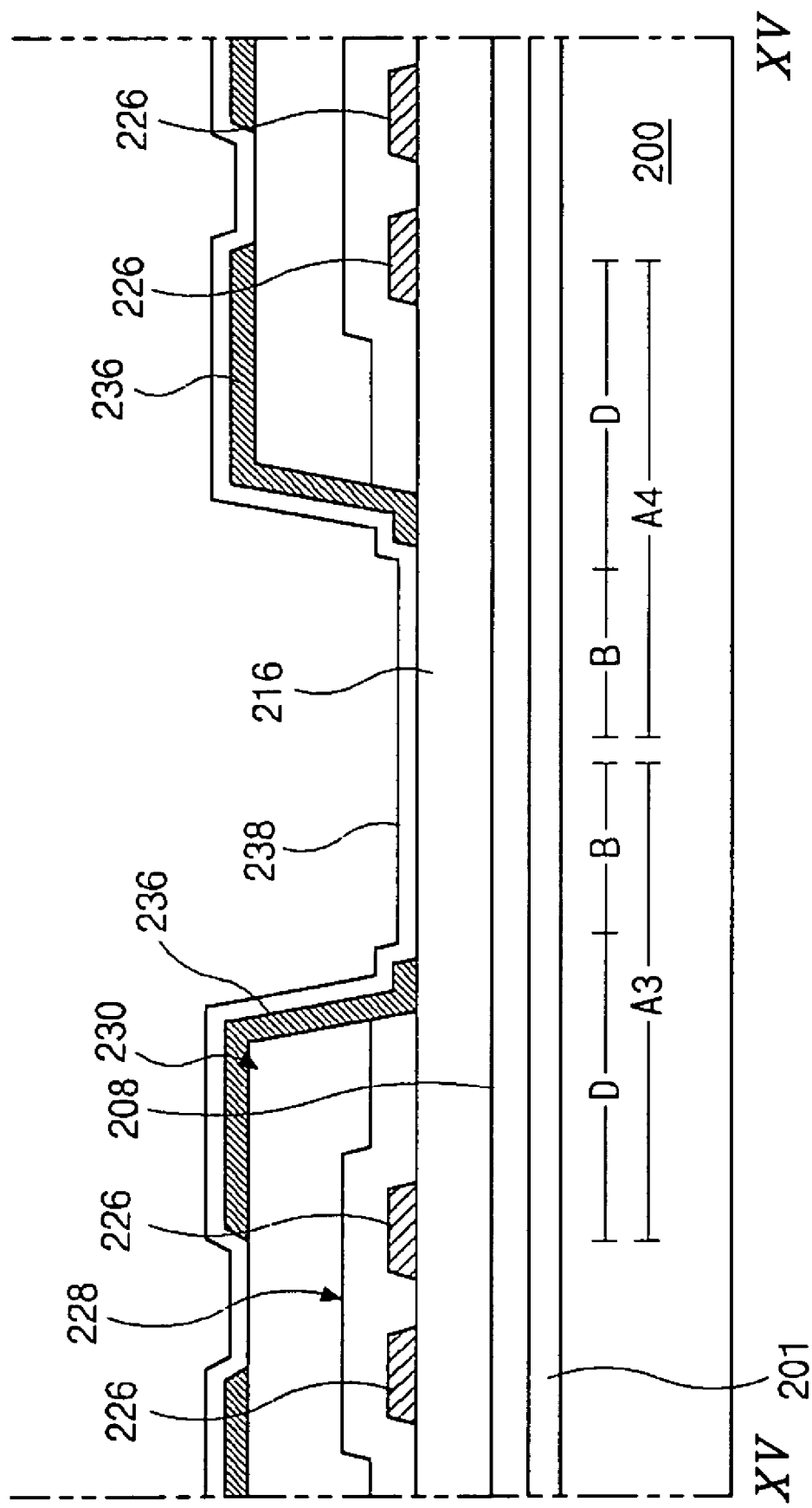
Figure 16E:
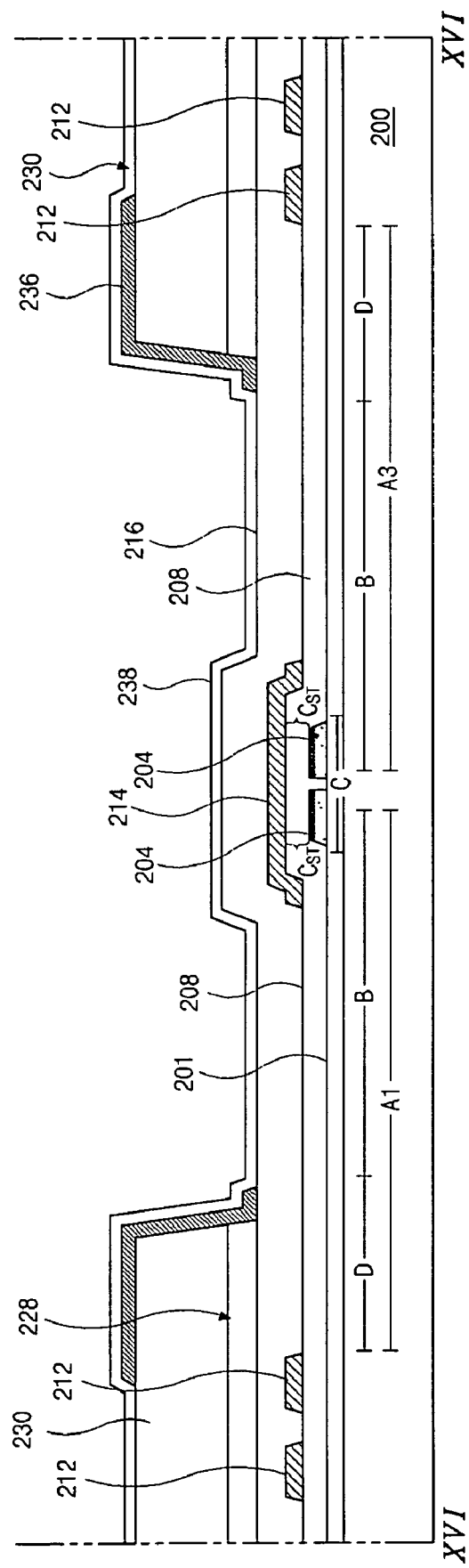

In FIGS. 14E, 15E and 16E, a third metallic material having a superior reflectivity is deposited on the second passivation layer 230 and then patterned to form reflectors 236 within the reflective portions D of the first to fourth sub-pixel regions A1–A4. As shown in FIG. 14E, the reflector 236 has a first exposing hole EH1 that corresponds to the third contact hole 232 to expose the portion of the drain electrode 224. Also the reflectors 236 do not cover the transmissive portions B, as shown in FIGS. 15E and 16E.

After forming the reflectors 236, an inorganic material of silicon nitride (SiNX) or silicon oxide (SiO2) is applied to over the entire substrate 200 to cover the reflector 236, thereby forming the third passivation layer 238. The third passivation layer 238 has a second exposing hole EH2 that corresponds to the first exposing hole EH1 to expose the portion of the drain electrode 224.

Figure 14F:
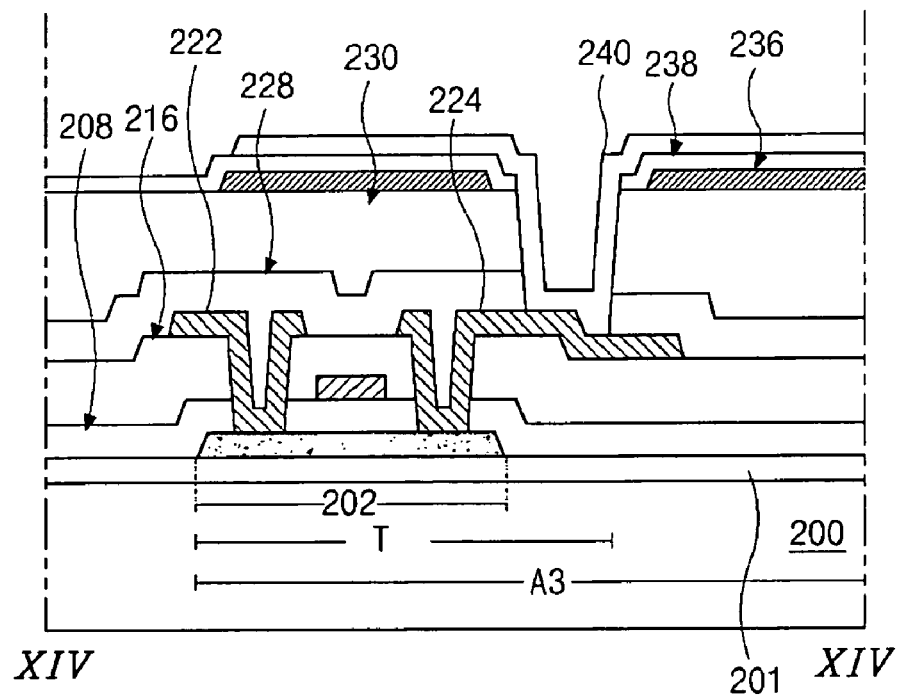
Figure 16F:
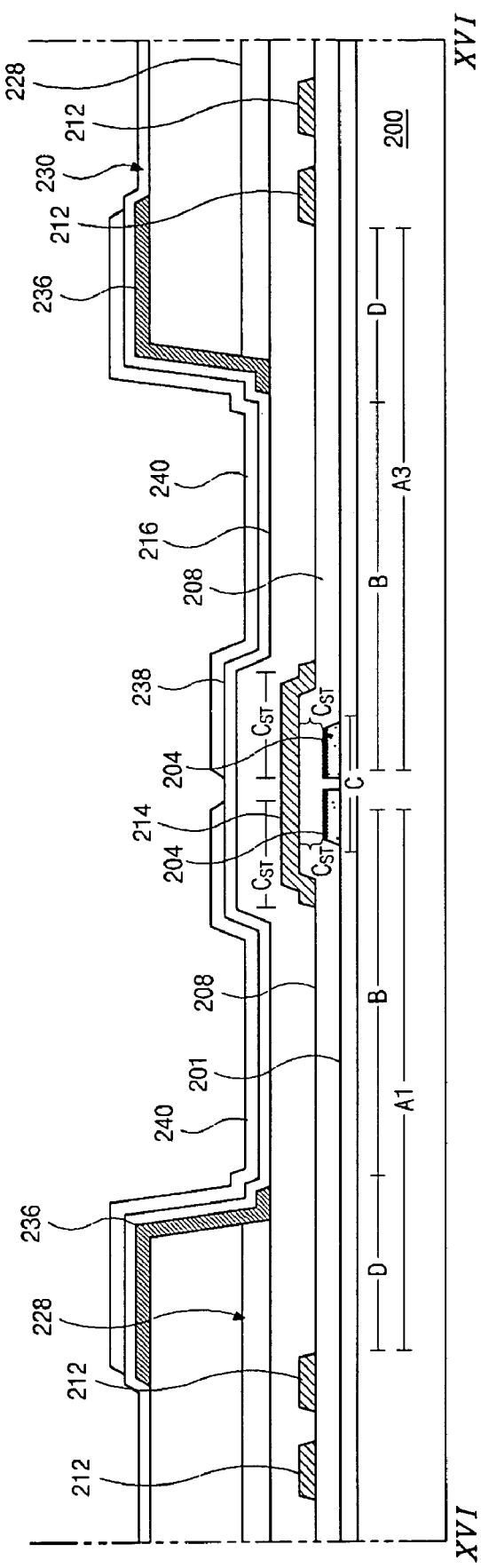

Next in FIGS. 14F, 15F and 16F, a transparent conductive material is deposited on an entire surface of the third passivation layer 238. And then the transparent conductive material is patterned to form transparent pixel electrodes 240 in the first to fourth sub-pixel regions A1–A4. Each transparent pixel electrode 240 is disposed within each of the first to fourth sub-pixel regions A1–A4, and contacts the drain electrode 224 through the previously formed contact hole EH2. Furthermore, each transparent pixel electrode 240 overlaps a portion of the storage line 214 and also portions of the gate and data lines 104 and 118. The portion of the transparent pixel electrode 240 overlapping the storage line 214 forms a storage capacitor $C_{ST}$ with the overlapped portion of the storage line 214. Therefore, a double storage capacitor structure exists in the second embodiment as shown in FIG. 16F.

Now modifications of the first and second embodiments will be explained with reference to FIGS. 17 and 18. The embodiments modified from the first and second embodiments have an L-shaped storage capacitor in each sub-pixel region.

Figure 17:
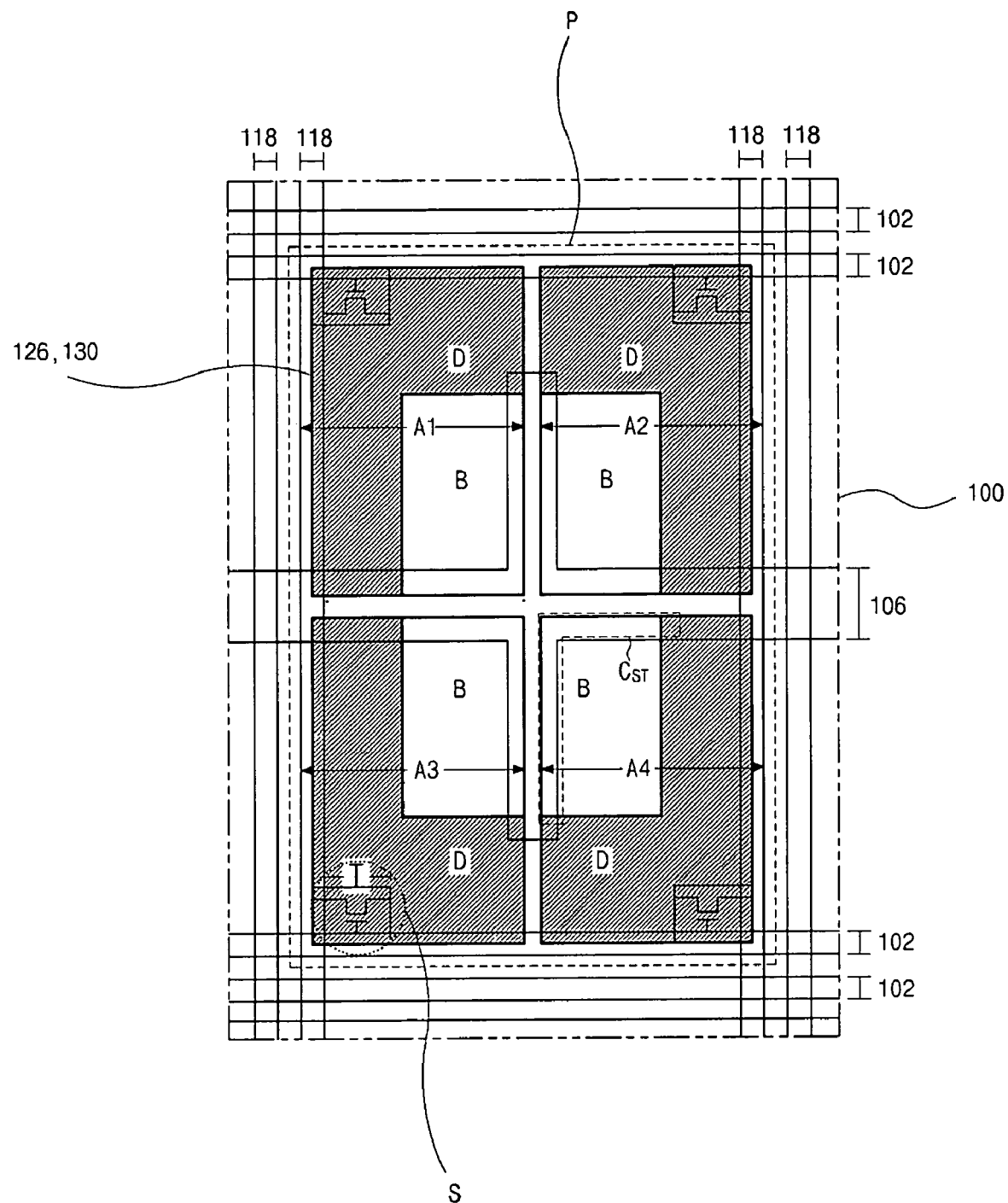
FIG. 17 is a plan view illustrating a modification of the first embodiment.

FIG. 17 is a plan view illustrating a modification of the first embodiment. FIG. 17 is very similar to FIG. 7, but the storage line 106 has a different structure. The storage line 106 is disposed horizontally across the middle of the unit pixel P along a border between the first and third sub-pixel regions A1–A3 and between the second and fourth sub-pixel regions A2 and A4. Additionally, the storage line 106 extends vertically along borders between the first and second sub-pixel regions A1–A2 and between the third and fourth sub-pixel regions A3–A4. Namely, the storage line 106 has a crisscross pattern in the unit pixel P. As a result of such crisscross pattern of the storage line 106, the portion of transparent pixel electrode 130 overlapping the storage line 106 is shaped like the letter "L", such that each of the sub-pixel regions A1–A4 has an L-shaped storage capacitor $C_{ST}$ as shown in FIG. 17. Furthermore, the unit pixel P has a cruciform storage capacitor in the transmissive portions B. This structure increases the capacitance to form an LCD panel with an ultra high resolution display.

Figure 18:
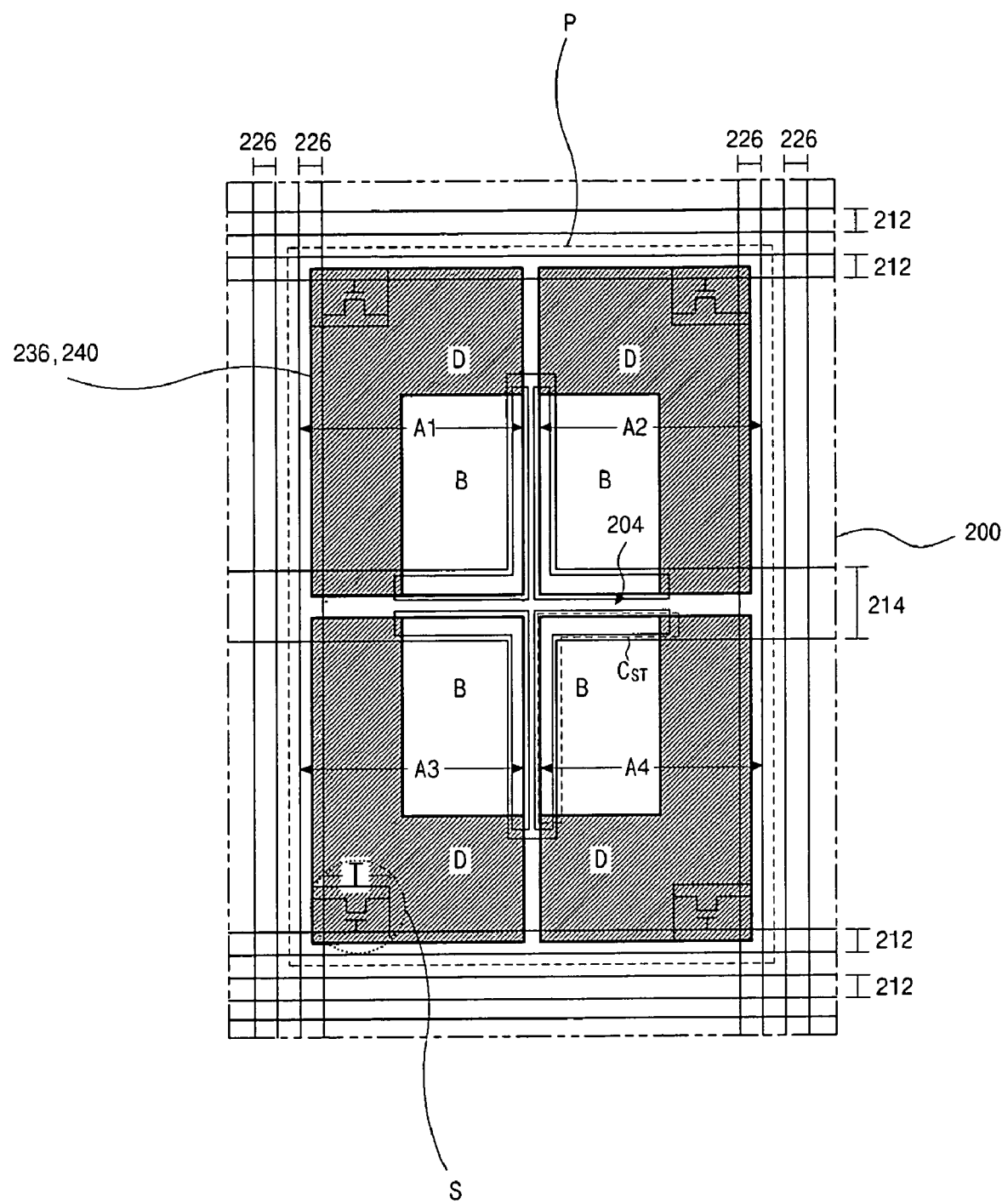
FIG. 18 is a plan view illustrating a modification of the second embodiment.

FIG. 18 is a plan view illustrating a modification of the second embodiment that is similar to the modification shown in FIG. 17. FIG. 18 is similar to FIG. 12, but the storage line 214 has a different structure. The storage line 214 is disposed horizontally across the middle of the unit pixel P along a border between the first and third sub-pixel regions A1–A3 and between the second and fourth sub-pixel regions A2 and A4. Additionally, the storage line 214 extends vertically along borders between the first and second sub-pixel regions A1–A2 and between the third and fourth sub-pixel regions A3–A4. Namely, the storage line 214 has a crisscross pattern in the unit pixel P similar to that shown in FIG. 17. As a result of such crisscross pattern of the storage line 214, the portion of transparent pixel electrode 240 overlapping the storage line 214 is shaped like the letter "L", such that each of the sub-pixel regions A1–A4 has an L-shaped storage capacitor $C_{ST}$ as shown in FIG. 18. Furthermore, the polysilicon pattern 214 corresponding to each of the first to fourth sub-pixel regions A1–A4 is shaped like a letter "L", and thus the L-shaped polysilicon pattern 214 disposed under the storage line 214 also forms an L-shaped storage capacitor $C_{ST}$. According to the embodiment shown in FIG. 18, the unit pixel P has a cruciform storage capacitor.

Figure 19:
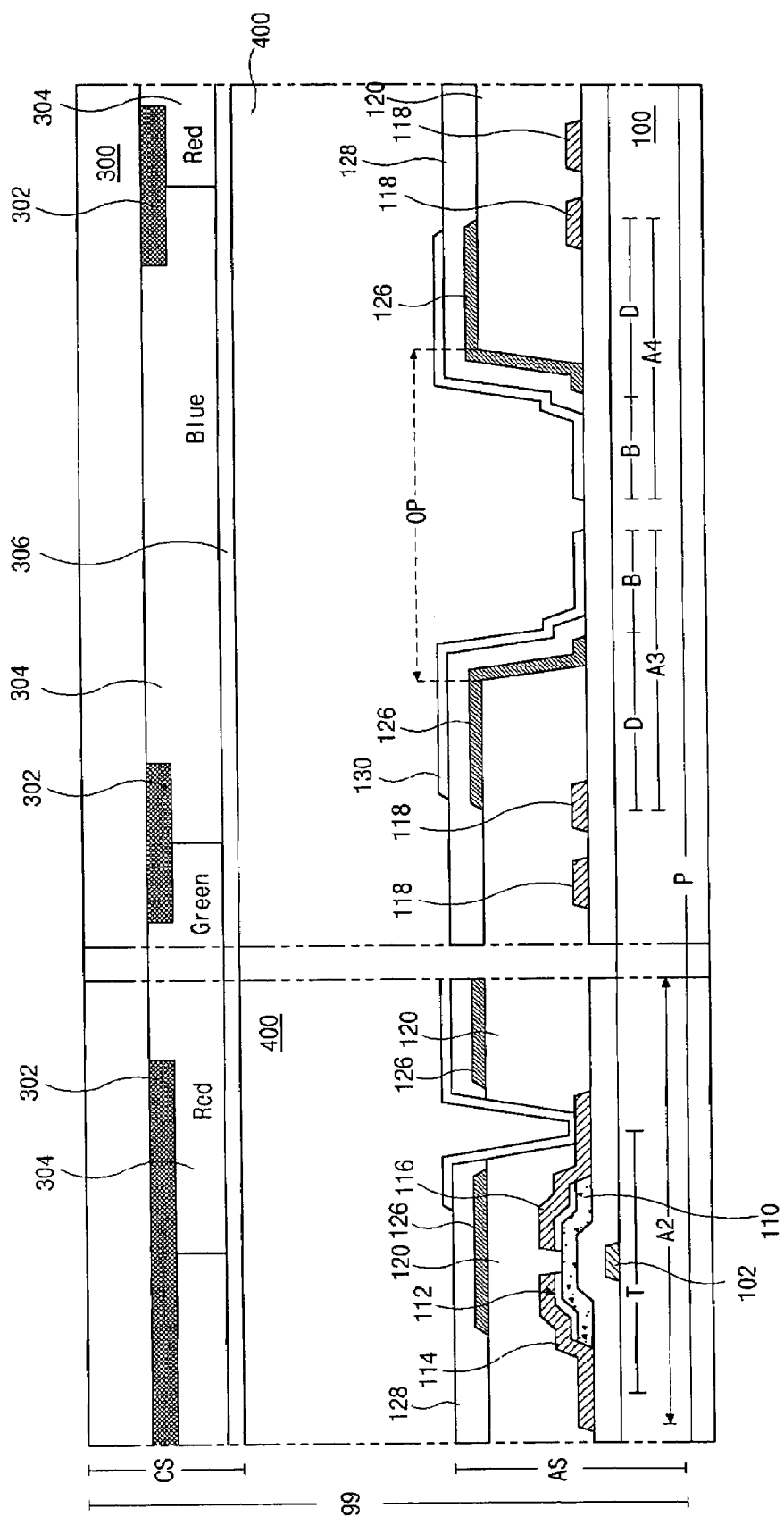
FIG. 19 is a cross section view illustrating an LCD panel where the first embodiment is employed.

FIG. 19 is a cross section view illustrating an LCD panel in which the first embodiment is employed. As shown, a transflective LCD device 99 includes an array substrate AS, a color filter substrate CS, and a liquid crystal layer 400 interposed between the array substrate AS and the color filter substrate CS. Over a substrate 100 of the array substrate AS, gate lines (not show) and data lines 118 are disposed perpendicularly crossing to each other so they define unit pixels P. As described before, two of the gate data lines are side by side, thereby forming the twin gate and data lines, respectively. The unit pixel P includes checked-patterned first to fourth sub-pixel regions. A1–A4. Each of the first to fourth sub-pixel regions A1–A4 has a transmissive portion B and a reflective portion. D. The transmissive portions B of the first to fourth sub-pixel regions are come together in the middle of the unit pixel. P. Near a crossing of the gate and data lines, an amorphous thin film transistor T is disposed. The amorphous thin film transistor T includes a gate electrode 102, an amorphous silicon active layer 110, a source electrode 114 and a drain electrode. 116. A passivation layer 120 is formed over an entire of the substrate 100, but has an opening OP that corresponds to the transmissive portions B of the first to fourth sub-pixel regions A1–A4.

In the color filter substrate CS, a black matrix 302 is disposed on a rear surface of a substrate. 300. The black matrix 302 corresponds to the amorphous thin film transistor T, the gate lines (not shown) and the data lines. 118. A color filter layer 304 having red, green and blue colors is also disposed on the rear surface of the substrate 300, and overlaps the black matrix 302. The red, green and blue colors of the color filter layer 304 correspond to the sub-pixels A1–A4, respectively. A common electrode 306 is formed on a rear surface of the color filter layer 304.

In the transflective LCD device shown in FIG. 19, the liquid crystal layer 400 has a first thickness in the transmissive portions B and a second thickness in the reflective portions D because the passivation layer has the opening OP that corresponds to the transmissive portions B. This thickness difference in the liquid crystal layer 400 equalizes the distance though the liquid crystal (and thus phase difference) that the light travels between the transmissive mode and the reflective mode. Accordingly, a high resolution transflective LCD device is produced.

Figure 20:
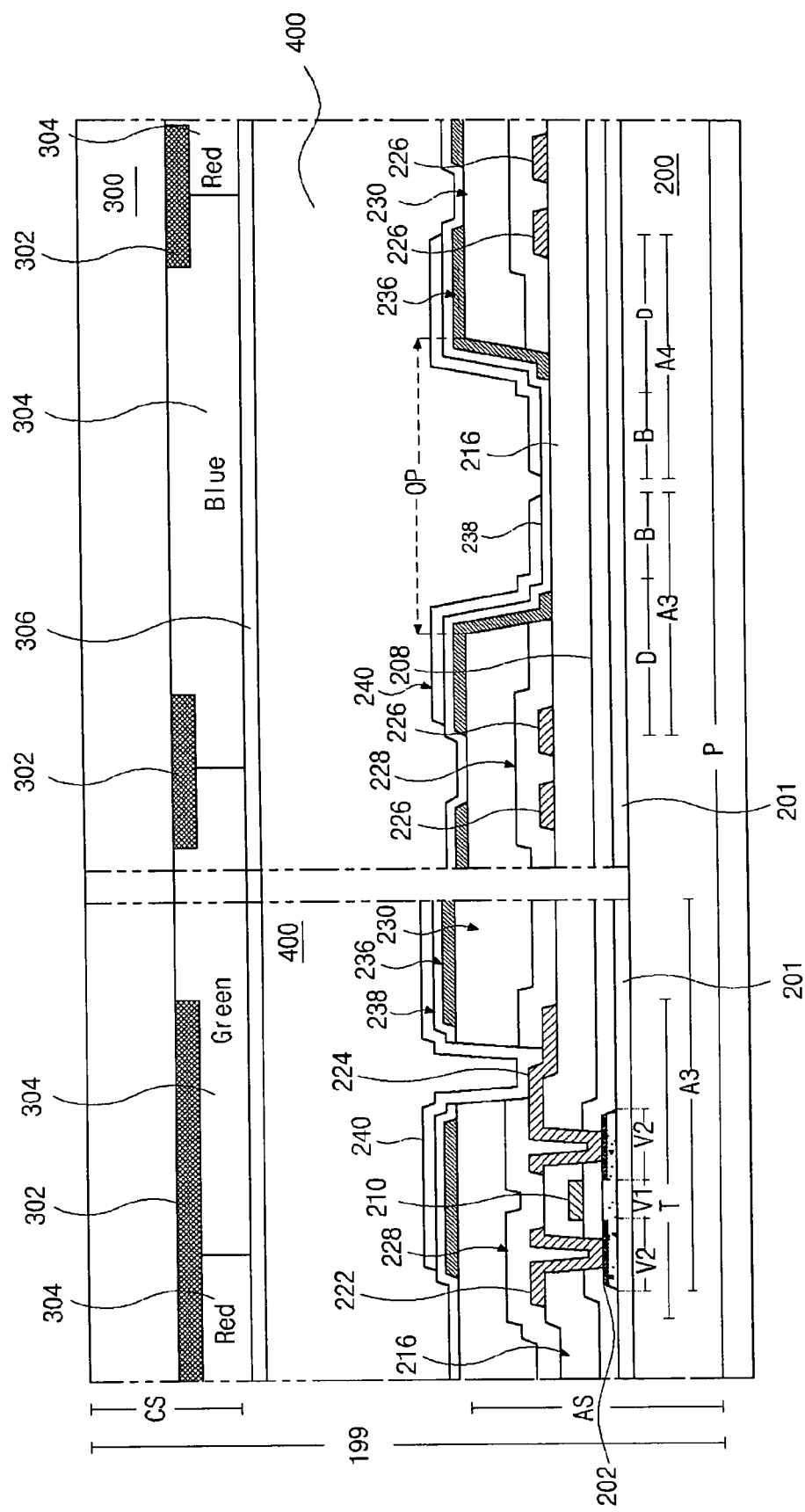
FIG. 20 is a cross section view illustrating an LCD panel where the second embodiment is employed.

FIG. 20 is a cross section view illustrating an LCD panel in which the second embodiment is employed. As shown, a transflective LCD device 199 includes an array substrate AS, a color filter substrate CS, and a liquid crystal layer 400 interposed between the array substrate AS and the color filter substrate CS. Over a substrate 200 of the array substrate AS, gate lines (not show) and data lines 226 are disposed perpendicularly crossing to each other so they define unit pixels P. As described before, two of the gate data lines are side by side, thereby forming the twin gate and data lines, respectively. The unit pixel P includes the first to fourth sub-pixel regions A1–A4. Each of the first to fourth sub-pixel regions A1–A4 has a transmissive portion B and a reflective portion. D. The transmissive portions B of the first to fourth sub-pixel regions are come together in the middle of the unit pixel. P. Near a crossing of the gate and data lines, a polysilicon thin film transistor T is disposed. The polysilicon thin film transistor T includes a polycrystalline silicon active layer 202, a gate electrode 210, a source electrode 222 and a drain electrode. 224. The first and second passivation layers 228 and 230 covering the polysilicon thin film transistor T have an opening OP that corresponds to the transmissive portions B of the first to fourth sub-pixel regions A1–A4.

As like the color filter substrate in the first embodiment shown in FIG. 19, the color filter substrate CS includes a black matrix 302 on a rear surface of a substrate. 300. The black matrix 302 corresponds to the amorphous thin film transistor T, the gate lines (not shown) and the data lines 226. A color filter layer 304 having red, green and blue colors is also disposed on the rear surface of the substrate 300, and overlaps the black matrix 302. The red, green and blue colors of the color filter layer 304 correspond to the sub-pixels A1–A4, respectively A common electrode 306 is formed on a rear surface of the color filter layer. 304. In the transflective LCD device shown in FIG. 20, the liquid crystal layer 400 has a first thickness in the transmissive portions B and a second thickness in the reflective portions D because the passivation layer has the opening OP that corresponds to the transmissive portions B. As above, this thickness difference in the liquid crystal layer 400 equalizes the light passage between the transmissive mode and the reflective mode and permits a high resolution transflective LCD device to be provided.

Accordingly, the embodiments of present invention have the following advantages. First, as the transmissive portions are gathered in the middle of the unit pixel, the border area between the transmissive portion and the reflective portions is halved. Thus, the aperture ratio increases as the border area is reduced. Second, since the transmissive portions of the sub-pixels are gathered together in the middle of the unit pixel, the transmissive portion group forms relatively large area and helps to better conduct the rubbing process. Therefore, the transmissive portions have improved optical characteristics. Third, the storage capacitance provided by the storage capacitor increases, permitting an ultra-high resolution transflective LCD device to be produced.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A transflective liquid crystal display, comprising:
    gate and data lines crossing each other and defining a plurality of unit pixels, each unit pixel including a plurality of sub-pixel regions, each of the sub-pixel regions including a transmissive portion and a reflective portion, the transmissive portions gathered together within each unit pixel;
    a thin film transistor in each sub-pixel region near a crossing of one of the gate and data lines adjacent to the sub-pixel region;
    a passivation layer covering the thin film transistors and the gate and data lines, the passivation layer having openings that correspond to the transmissive portions in the unit pixels;
    a reflector formed over the passivation layer in each sub-pixel region, the reflector corresponding in position to the reflective portion;
    a pixel electrode in each sub-pixel region, the pixel electrode contacting the thin film transistor through a contact hole in the passivation layer.

2. The transflective liquid crystal display according to claim 1, wherein the unit pixel includes four thin film transistors disposed at different corners of the unit pixel.

3. The transflective liquid crystal display according to claim 2, wherein the transmissive portion in each sub-pixel region diametrically opposes the thin film transistor in the sub-pixel region.

4. The transflective liquid crystal display according to claim 1, wherein the thin film transistor includes a gate electrode extending from the gate line, an amorphous silicon active layer, a source electrode extending from the data line, and a drain electrode spaced apart from the source electrode across the gate electrode.

5. The transflective liquid crystal display according to claim 1, further comprising storage lines that are parallel with the gate lines and disposed between the sub-pixel regions.

6. The transflective liquid crystal display according to claim 5, wherein the storage line of each unit pixel has a crisscross pattern shape.

7. The transflective liquid crystal display according to claim 6, wherein the pixel electrode in each sub-pixel region overlaps the storage line and forms a storage capacitor.

8. The transflective liquid crystal display according to claim 1, wherein each thin film transistor includes a polycrystalline silicon layer, a gate electrode extending from the gate line over the polycrystalline silicon layer, a source electrode extending from the data line, and a drain electrode spaced apart from the source electrode across the source electrode.

9. The transflective liquid crystal display according to claim 8, further comprising storage lines that are parallel with the gate lines, wherein the storage lines are disposed between the sub-pixel regions in each unit pixel.

10. The transflective liquid crystal display according to claim 9, wherein each storage line has a crisscross pattern shape in the unit pixel.

11. The transflective liquid crystal display according to claim 10, further comprising a polysilicon pattern underneath the storage line in each sub-pixel region.

12. The transflective liquid crystal display according to claim 11, wherein the polysilicon pattern is shaped like a letter L and forms a storage capacitor with the storage line.

13. The transflective liquid crystal display according to claim 1, further comprising a color filter substrate that includes
    a black matrix on a substrate, the black matrix corresponding to the thin film transistors and the gate and data lines;
    a color filter layer on the substrate to cover the black matrix, the color filter layer having red, green and blue colors that corresponds to the sub-pixel regions; and
    a common electrode on the color filter layer.

14. The transflective liquid crystal display according to claim 1, wherein two gate lines are disposed side by side and constitute twin gate lines.

15. The transflective liquid crystal display according to claim 1, wherein two data lines are disposed side by side and constitute twin data lines.

16. A method of forming an array substrate in a transflective liquid crystal display, the method comprising:
    forming a plurality of gate lines, a plurality of storage lines, and a plurality of gate electrodes on a substrate;
    forming a gate insulating layer on the substrate to cover the gate lines, the storage lines and the gate electrodes;
    forming an active layer and an ohmic contact layer in series over each of the gate electrodes on the gate insulating layer;
    forming a plurality of data lines, a plurality of source electrodes, and a plurality of drain electrodes over the gate insulating layer, each of the source and drain electrodes contacting the ohmic contact layer, the data lines perpendicularly crossing the gate lines to define unit pixels, each of the unit pixels including a plurality of sub-pixel regions, each sub-pixel region including a transmissive portion and a reflective portion, and the reflective portions of the sub-pixel regions gathered together in a center of each unit pixel;

forming a first passivation layer on the gate insulating layer to cover the data lines, the source electrodes and the drain electrodes, the first passivation layer including, in each unit pixel, a contact hole exposing a portion of the drain electrode and a first opening exposing the gate insulating layer in the transmissive portions;

forming reflectors within the reflective portions, each reflector corresponding to each sub-pixel region;

forming a second passivation layer on the first passivation layer to cover the reflectors, the second passivation layer having a second opening exposing the gate insulating layer in the transmissive portions;

forming pixel electrodes on the second passivation layer in the sub-pixel regions.

17. The method according to claim 16, wherein two of the gate lines are disposed side by side and form twin gate lines.

18. The method according to claim 17, wherein the storage lines are parallel with the gate lines and each storage line is disposed between adjacent twin gate lines.

19. The method according to claim 16, wherein two of the data lines are disposed side by side and form twin data lines.

20. The method according to claim 16, wherein the first passivation layer is an inorganic material selected from a group consisting of silicon nitride and silicon oxide.

21. The method according to claim 16, wherein the second passivation layer has a contact hole that exposes the portion of the drain electrode in each unit cell.

22. The method according to claim 17, wherein the pixel electrodes overlap portions of the gate, data and storage lines.

23. The method according to claim 22, wherein a portion of the storage line overlapped by the pixel electrode forms a storage capacitor corresponding to each sub-pixel region.

24. The method according to claim 16, wherein the unit pixel includes four thin film transistors disposed at different corners of the unit pixel.

25. The method according to claim 24, wherein the transmissive portion is disposed in an area opposite to the thin film transistor within each sub-pixel region.

26. The method according to claim 16, wherein each storage line is disposed between the sub-pixel regions.

27. The method according to claim 16, wherein each storage line has a crisscross pattern shape.

28. The method according to claim 27, wherein the pixel electrode overlaps the storage line and forms a L-shaped storage capacitor in each sub-pixel region.

29. A method of forming an array substrate in a transflective liquid crystal display, the method comprising:

defining a plurality of unit pixels in a substrate, each of the unit pixels including a plurality of sub-pixel regions, each sub-pixel region including a transmissive portion and a reflective portion, the reflective portions of the sub-pixel regions gathered together in a center of each unit pixel;

forming a buffer layer on the entire substrate;

forming a plurality of polycrystalline silicon layers and a plurality of polysilicon patterns, the polycrystalline silicon layers disposed near corners of the unit pixels, the polysilicon patterns disposed between the sub-pixel regions;

forming a gate insulating layer on the buffer layer to cover the polycrystalline silicon layers and the polysilicon patterns;

forming a plurality of gate lines, a plurality of storage lines, and a plurality of gate electrodes on the gate insulating layer;

forming a first passivation layer on the gate insulation layer to cover the gate lines, the storage lines and the gate electrodes, the first passivation layer and the gate insulating layers having contacts holes exposing portions of the polycrystalline silicon layers;

forming a plurality of data lines, a plurality of source electrodes, and a plurality of drain electrode on the first passivation layer, each of the source and drain electrodes contacting the polycrystalline silicon layer through the contact holes, the data lines perpendicularly crossing the gate lines to define the unit pixels;

forming second and third passivation layers in series on the first passivation layer to cover the data lines, the source electrodes and the drain electrodes, the second and third passivation layers including in each unit pixel a first contact hole exposing a portion of the drain electrode and a first opening exposing the first passivation layer in the transmissive portions;

forming reflectors within the reflective portions, each reflector corresponding to each sub-pixel region;

forming a fourth passivation layer on the third passivation layer to cover the reflectors, the second passivation layer in each unit pixel having a second contact hole exposing the portion of the drain electrode;

forming pixel electrodes on the fourth passivation layer in the sub-pixel regions, each pixel electrode contacting the drain electrode through the second contact hole.

30. The method according to claim 29, wherein two of the gate lines are disposed side by side and form twin gate lines.

31. The method according to claim 30, wherein the storage lines are parallel with the gate lines and each storage line is disposed between adjacent twin gate lines.

32. The method according to claim 29, wherein two of the data lines are disposed side by side and form twin data lines.

33. The method according to claim 29, wherein the third passivation layer is an inorganic material selected from a group consisting of silicon nitride and silicon oxide.

34. The method according to claim 29, wherein the pixel electrodes overlap portions of the gate, data and storage lines.

35. The method according to claim 34, wherein the portion of storage line overlapped by the pixel electrode forms a storage capacitor corresponding to each sub-pixel region.

36. The method according to claim 29, wherein the unit pixel includes four thin film transistors disposed at different corners of the unit pixel.

37. The method according to claim 36, wherein the transmissive portion is disposed in an area opposite to the thin film transistor within each sub-pixel region.

38. The method according to claim 29, wherein each storage line is disposed between the sub-pixel regions and overlaps the polysilicon patterns.

39. The method according to claim 29, wherein each storage line has a crisscross pattern shape.

40. The method according to claim 39, wherein each of the polysilicon patterns is shaped like a letter L.

41. The method according to claim 40, wherein the pixel electrode overlaps the storage line and forms a L-shaped storage capacitor in each sub-pixel region.

42. A method of forming a transflective liquid crystal display, the method comprising:
  forming gate and data lines that perpendicularly cross each other and define a plurality of unit pixels, each unit pixel including a plurality of sub-pixel regions, each sub-pixel region including a transmissive portions and a reflective portion, the transmissive portions gathered together within each unit pixel;
  forming a thin film transistors in each sub-pixel region near a crossing of the gate and data lines;
  forming a passivation layer to cover the thin film transistors and the gate and data lines, the passivation layer having an opening that corresponds to the transmissive portions in each unit pixel;
  forming a reflector formed over the passivation layer in each sub-pixel region, the reflector corresponding in position to the reflective portion;
  forming a pixel electrode in each sub-pixel region, the pixel electrode contacting the thin film transistor throughout a contact hole in the passivation layer.

43. The method according to claim 42, wherein the unit pixel includes four thin film transistors disposed at different corners of the unit pixel.

44. The method according to claim 43, wherein each transmissive portion is disposed in an area opposite to the thin film transistor within each sub-pixel region.

45. The method according to claim 42, wherein each thin film transistor includes a gate electrode extending from the gate lines, an amorphous silicon active layer, a source electrode extending from the data line, and a drain electrode spaced apart from the source electrode across the gate electrode.

46. The method according to claim 42, further comprising forming a storage line in each unit pixel that is parallel with the gate line, the storage line disposed between the sub-pixel regions.

47. The method according to claim 46, wherein each storage line has a crisscross pattern shape in the unit pixel.

48. The method according to claim 47, wherein the pixel electrode overlaps the storage line and forms a storage capacitor in each sub-pixel region.

49. The method according to claim 42, wherein each thin film transistor includes a polycrystalline silicon layer, a gate electrode extending from the gate line over the polycrystalline silicon layer, a source electrode extending from the data line, and a drain electrode spaced apart from the source electrode across the source electrode.

50. The method according to claim 49, further comprising forming a storage line in each unit pixel that is parallel with the gate lines, the storage line disposed between the sub-pixel regions and has a crisscross pattern shape.

51. The method according to claim 50, further comprising forming a polysilicon pattern underneath the storage line in each sub-pixel region.

52. The method according to claim 51, wherein each polysilicon pattern is shaped like a letter L and forms a storage capacitor with the storage line.

53. The method according to claim 42, further comprising forming a color filter substrate that includes:
  a black matrix on a substrate, the black matrix corresponding to the thin film transistors and the gate and data lines;
  a color filter layer on the substrate to cover the black matrix, the color filter layer having red, green and blue colors that corresponds to the sub-pixel regions; and
  a common electrode on the color filter layer.

54. The method according to claim 42, wherein two gate lines are disposed side by side and constitute twin gate lines.

55. The method according to claim 42, wherein two data lines are disposed side by side and constitute twin data lines.

56. A transflective liquid crystal display, comprising first and second substrates having a liquid crystal layer disposed therebetween, the first substrate having gate and data lines defining unit pixels, each unit pixel including a plurality of sub-pixel regions, each of the sub-pixel regions including a reflective portion containing a reflector and a transmissive portion, adjacent pairs of the transmissive portions in different sub-pixel regions within each unit pixel arranged such that no reflective portion is disposed between the pair of transmissive portions, wherein the transmissive portion is devoid of the reflector.

57. The transflective liquid crystal display according to claim 56, wherein the transmissive portion and a thin film transistor in each sub-pixel region are arranged at opposite sides of the sub-pixel region.

58. The transflective liquid crystal display according to claim 56, further comprising storage lines parallel with the gate lines and traversing the unit pixels.

59. The transflective liquid crystal display according to claim 58, wherein the storage lines traverse centers of each unit pixel.

60. The transflective liquid crystal display according to claim 58, wherein the storage line of each sub-pixel region overlaps sides of the sub-pixel region.

61. The transflective liquid crystal display according to claim 59, wherein a region of overlap between the storage line and transmissive portion of each sub-pixel region forms an L shape.

62. The transflective liquid crystal display according to claim 58, further comprising a pixel electrode in each sub-pixel region that overlaps the storage line and forms a storage capacitor.

63. The transflective liquid crystal display according to claim 60, further comprising a polysilicon pattern underneath the storage line in each sub-pixel region and that forms a storage capacitor with the storage line.

64. The transflective liquid crystal display according to claim 56, wherein at least one of multiple gate lines and multiple data lines are disposed adjacent to each other between adjacent unit pixels.

65. The transflective liquid crystal display according to claim 56, wherein a thickness of the liquid crystal in the transmissive portions is about twice as large as a thickness of the liquid crystal in the reflective portions.

66. The transflective liquid crystal display according to claim 56, wherein the second substrate comprises:
  a black matrix corresponding to the gate and data lines and thin film transistors on the first substrate;
  a color filter layer that covers the black matrix and has red, green and blue colors; and
  a common electrode on the color filter layer.

67. The transflective liquid crystal display according to claim 66, wherein a single color covers all of the sub-pixel regions in a particular unit pixel and is different from the color covering at least some of the unit pixels adjacent to the particular unit pixel.

68. The transflective liquid crystal display according to claim 56, wherein the liquid crystal layer contains liquid crystal with a refractive index and thickness that provide substantially the same phase retardation value in the reflective and transmissive portions.

69. A transflective liquid crystal display, comprising first and second substrates having a liquid crystal layer disposed therebetween, the first substrate having gate and data lines defining unit pixels, each unit pixel including a plurality of sub-pixel regions, each of the sub-pixel regions including a transmissive portion, a reflective portion, a border area between the transmissive and reflective portions, a reflector and a passivation layer, the passivation layer and reflector disposed in the reflective portion and terminating in the border area before reaching the transmissive portion such that the border area contains a disclination of the passivation area and reflector that has a slope oblique to the first and second substrates, wherein the border area and reflective portion of at least one sub-pixel region in each unit pixel does not completely encircle the transmissive portion of the at least one sub-pixel region.

70. The transflective liquid crystal display according to claim 60, wherein the border area of each sub-pixel region does not completely encircle the transmissive portion of the sub-pixel region.

71. The transflective liquid crystal display according to claim 69, wherein the transmissive portions of the sub-pixel regions in each unit pixel are arranged at sides of the sub-pixel regions most proximate to a center of the unit pixel.

72. The transflective liquid crystal display according to claim 69, further comprising storage lines parallel with the gate lines and traversing the unit pixels.

73. The transflective liquid crystal display according to claim 72, wherein the storage lines traverse centers of each unit pixel.

74. The transflective liquid crystal display according to claim 72, wherein the storage line of each sub-pixel region overlaps sides of the sub-pixel region.

75. The transflective liquid crystal display according to claim 73, wherein a region of overlap between the storage line and transmissive portion of each sub-pixel region forms an L shape.

76. The transflective liquid crystal display according to claim 72, further comprising a pixel electrode in each sub-pixel region that overlaps the storage line and forms a storage capacitor.

77. The transflective liquid crystal display according to claim 75, further comprising a polysilicon pattern underneath the storage line in each sub-pixel region and that forms a storage capacitor with the storage line.

78. The transflective liquid crystal display according to claim 76, further comprising a polysilicon pattern underneath the storage line in each sub-pixel region and that forms an L-shaped storage capacitor with the storage line.

79. The transflective liquid crystal display according to claim 69, wherein at least one of multiple gate lines and multiple data lines are disposed adjacent to each other between adjacent unit pixels.

80. The transflective liquid crystal display according to claim 69, wherein a thickness of the liquid crystal in the transmissive portions is about twice as large as a thickness of the liquid crystal in the reflective portions.

81. The transflective liquid crystal display according to claim 69, wherein the second substrate comprises:
a black matrix corresponding to the gate and data lines and thin film transistors on the first substrate;
a color filter layer that covers the black matrix and has red, green and blue colors; and
a common electrode on the color filter layer.

82. The transflective liquid crystal display according to claim 81, wherein a single color covers all of the sub-pixel regions in a particular unit pixel and is different from the color covering at least some of the unit pixels adjacent to the particular unit pixel.

83. The transflective liquid crystal display according to claim 69, wherein the liquid crystal layer contains liquid crystal with a refractive index and thickness that provide substantially the same phase retardation value in the reflective and transmissive portions.

84. The transflective liquid crystal display according to claim 61, further comprising a polysilicon pattern underneath the storage line in each sub-pixel region and that forms an L-shaped storage capacitor with the storage line.

85. A transflective liquid crystal display, comprising:
gate and data lines crossing each other and defining a plurality of unit pixels, each unit pixel including a plurality of sub-pixel regions, each of the sub-pixel regions including a transmissive portion and a reflective portion, adjacent pairs of the transmissive portions in different sub-pixel regions within each unit pixel arranged such that no reflective portion is disposed between the pair of transmissive portions;
a thin film transistor in each sub-pixel region near a crossing of one of the gate and data lines adjacent to the sub-pixel region;
a passivation layer covering the thin film transistors and the gate and data lines, the passivation layer having openings that correspond to the transmissive portions in the unit pixels;
a reflector formed over the passivation layer in each sub-pixel region, the reflector corresponding in position to the reflective portion;
a pixel electrode in each sub-pixel region, the pixel electrode contacting the thin film transistor through a contact hole in the passivation layer.

86. A method of forming a transflective liquid crystal display, the method comprising:
forming gate and data lines that perpendicularly cross each other and define a plurality of unit pixels, each unit pixel including a plurality of sub-pixel regions, each sub-pixel region including a transmissive portions and a reflective portion, adjacent pairs of the transmissive portions in different sub-pixel regions within each unit pixel arranged such that no reflective portion is disposed between the pair of transmissive portions;
forming a thin film transistors in each sub-pixel region near a crossing of the gate and data lines;
forming a passivation layer to cover the thin film transistors and the gate and data lines, the passivation layer having an opening that corresponds to the transmissive portions in each unit pixel;
forming a reflector formed over the passivation layer in each sub-pixel region, the reflector corresponding in position to the reflective portion;
forming a pixel electrode in each sub-pixel region, the pixel electrode contacting the thin film transistor throughout a contact hole in the passivation layer.

* * * * *